(12) United States Patent
Hu et al.

(10) Patent No.: US 10,901,462 B2
(45) Date of Patent: Jan. 26, 2021

(54) SYSTEM AND METHOD FOR TOUCH INPUT

(71) Applicant: Samsung Electronics Co., Ltd, Suwon-si (KR)

(72) Inventors: Yiting Hu, Mountain View, CA (US); Matthew Thomas, Mountain View, CA (US); Kitae Kim, Mountain View, CA (US); James E Van Den Heuvel, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/168,556

(22) Filed: Oct. 23, 2018

(65) Prior Publication Data

US 2019/0129473 A1    May 2, 2019

Related U.S. Application Data

(60) Provisional application No. 62/577,327, filed on Oct. 26, 2017, provisional application No. 62/577,309, filed on Oct. 26, 2017.

(51) Int. Cl.
*G06F 1/16*    (2006.01)
*G06F 3/041*   (2006.01)
*G06F 3/0354*  (2013.01)

(52) U.S. Cl.
CPC .......... *G06F 1/1643* (2013.01); *G06F 1/1662* (2013.01); *G06F 1/1681* (2013.01);
(Continued)

(58) Field of Classification Search
None
See application file for complete search history.

(56) References Cited

U.S. PATENT DOCUMENTS

| 8,098,233 B2 | 1/2012 | Hotelling et al. |
| 8,635,544 B2 | 1/2014 | Kim et al. |

(Continued)

FOREIGN PATENT DOCUMENTS

| JP | 2014-154148 A | 8/2014 |
| KR | 100358015 B1 | 10/2002 |

(Continued)

OTHER PUBLICATIONS

International Search Report dated Feb. 1, 2019 in connection with International Patent Application No. PCT/KR2018/012834, 3 pages.

(Continued)

*Primary Examiner* — Stephen T. Reed

(57) ABSTRACT

An electronic device, a method of operating the electronic device and a laptop computing device are disclosed. The electronic device includes a housing with a first surface, a second surface, and a third surface, a keyboard positioned on a portion of the second surface. A primary display positioned on the first surface. A touch surface display positioned on a second portion of the second surface. A touch bar display positioned on the third surface. The electronic device further includes a processor that is configured to display a first set of content on the touch surface display. The processor is also configured to receive a first touch input on the touch surface display, the first touch input is associated with a portion of the displayed first set of content. In response to receiving the first touch input on the touch surface display, the processor is configured to perform a first function.

20 Claims, 16 Drawing Sheets

(52) U.S. Cl.
CPC ...... *G06F 3/03545* (2013.01); *G06F 3/03547* (2013.01); *G06F 3/0412* (2013.01)

(56) References Cited

U.S. PATENT DOCUMENTS

| | | | |
|---|---|---|---|
| 9,389,784 | B2 | 7/2016 | Kim et al. |
| 9,830,068 | B2 | 11/2017 | Oakley et al. |
| 9,977,594 | B2 | 5/2018 | Huh |
| 2003/0112589 | A1* | 6/2003 | Shimano .................. G06F 1/162 361/679.09 |
| 2008/0259046 | A1 | 10/2008 | Carsanaro |
| 2008/0275854 | A1 | 11/2008 | Doi et al. |
| 2012/0062490 | A1* | 3/2012 | Heatherly ............... A63F 13/02 345/173 |
| 2014/0198074 | A1 | 7/2014 | Wu |
| 2014/0217874 | A1 | 8/2014 | Lin et al. |
| 2014/0223387 | A1* | 8/2014 | Lin ...................... G06F 3/03547 715/863 |
| 2014/0258926 | A1 | 9/2014 | Min et al. |
| 2015/0020034 | A1* | 1/2015 | Okuley ................. G06F 1/1616 715/863 |
| 2015/0286359 | A1* | 10/2015 | Oakley ................. G06F 1/1637 345/173 |
| 2017/0222456 | A1* | 8/2017 | Perez .................... G06F 1/1681 |
| 2017/0285843 | A1* | 10/2017 | Roberts-Hoffman ........................ G06F 3/0227 |
| 2017/0336901 | A1 | 11/2017 | Mathew et al. |
| 2018/0373292 | A1* | 12/2018 | Perelli ..................... G06F 1/165 |

FOREIGN PATENT DOCUMENTS

| | | |
|---|---|---|
| KR | 10-2007-0094364 A | 9/2007 |
| KR | 100896129 B1 | 4/2009 |
| KR | 1020140048756 A | 4/2014 |
| KR | 10-2015-0069420 A | 6/2015 |

OTHER PUBLICATIONS

Written Opinion of the International Searching Authority dated Feb. 1, 2019 in connection with International Patent Application No. PCT/KR2018/012834, 6 pages.

* cited by examiner

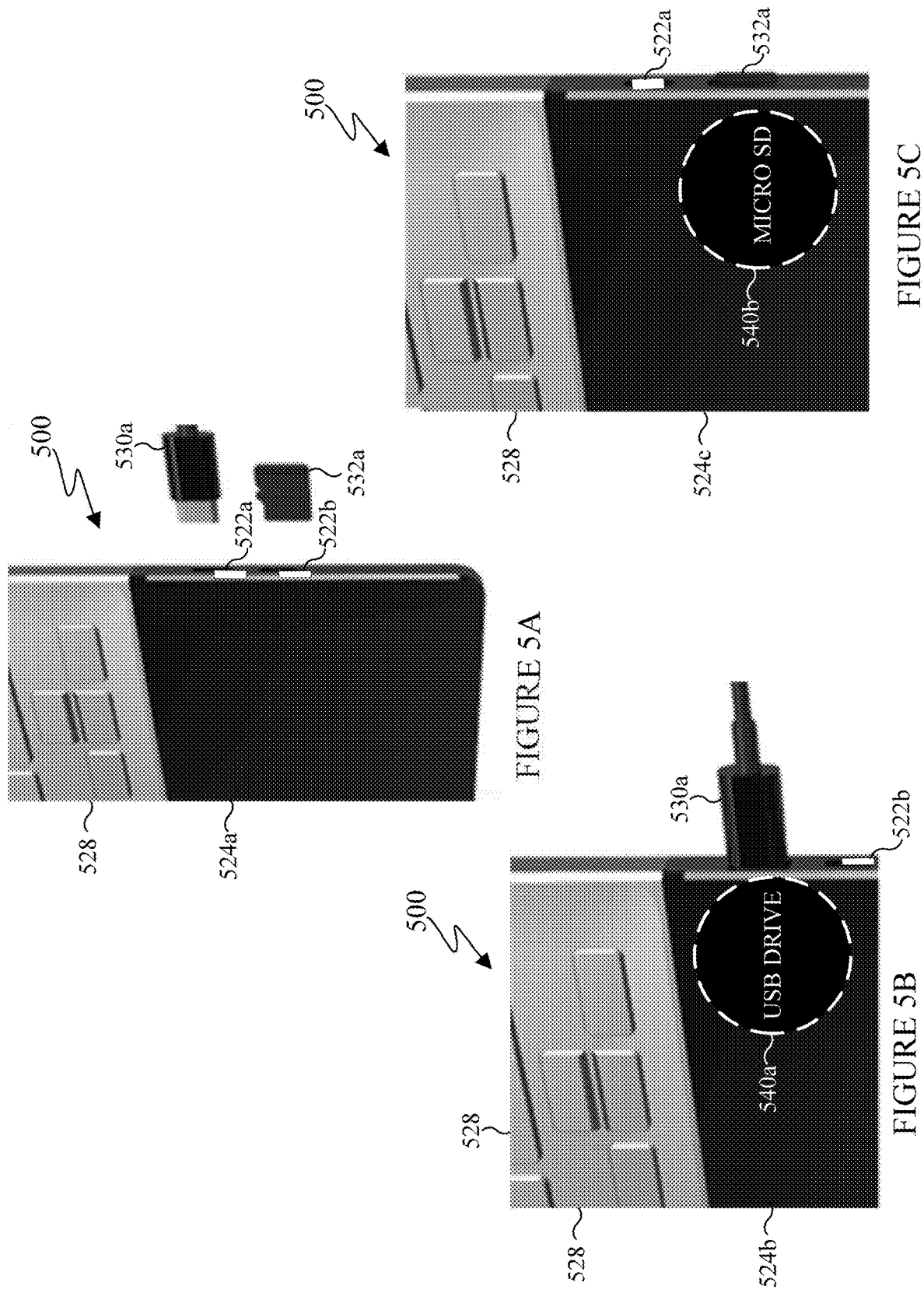

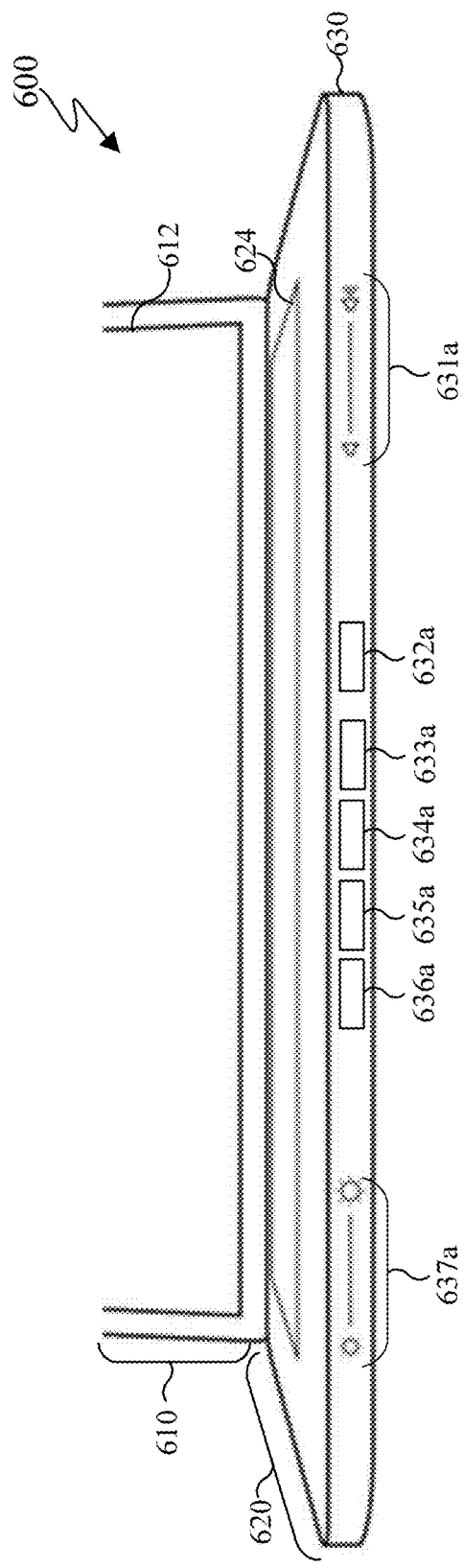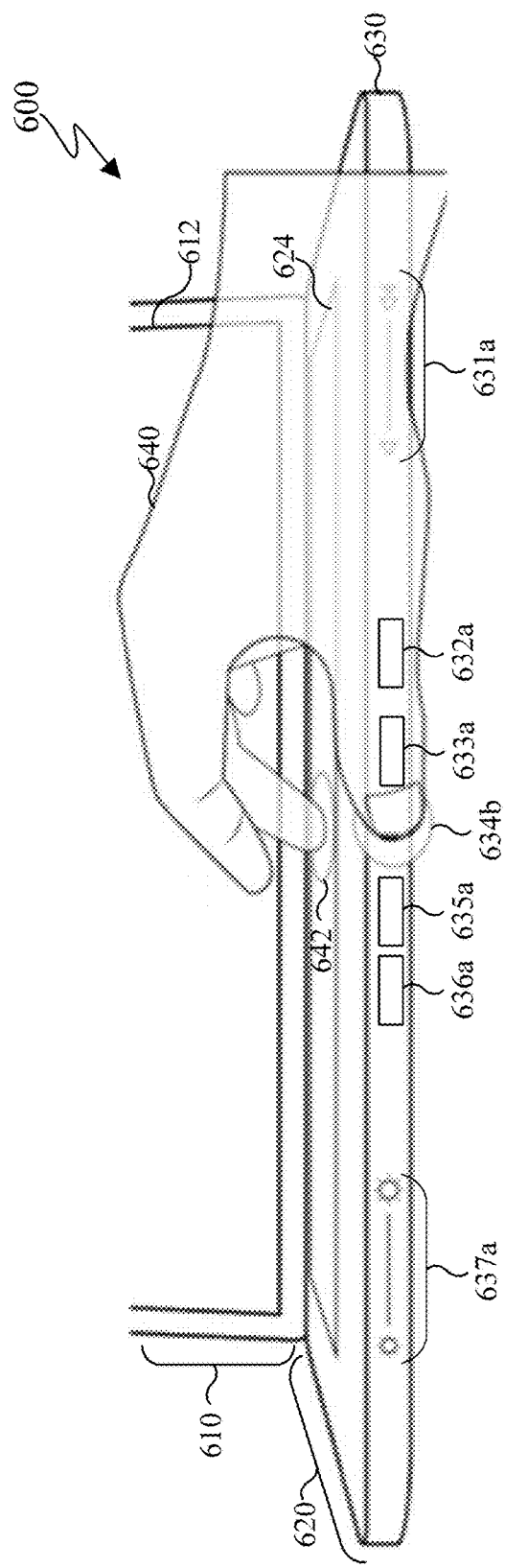

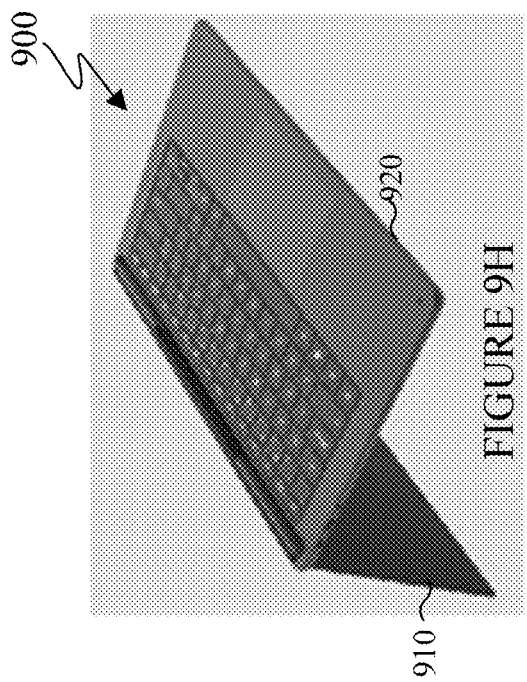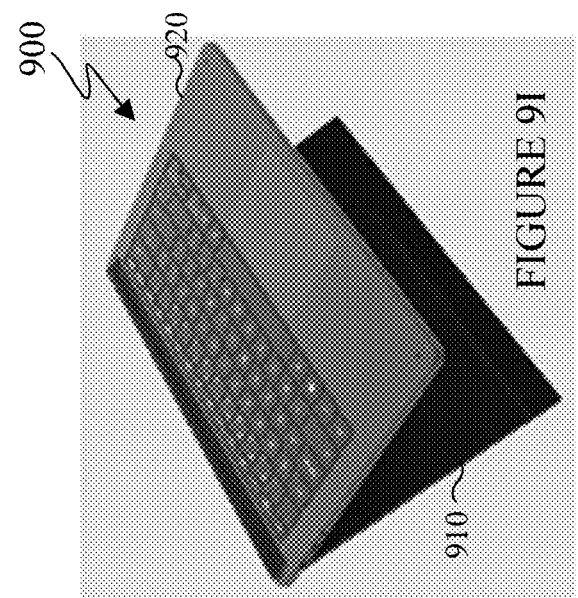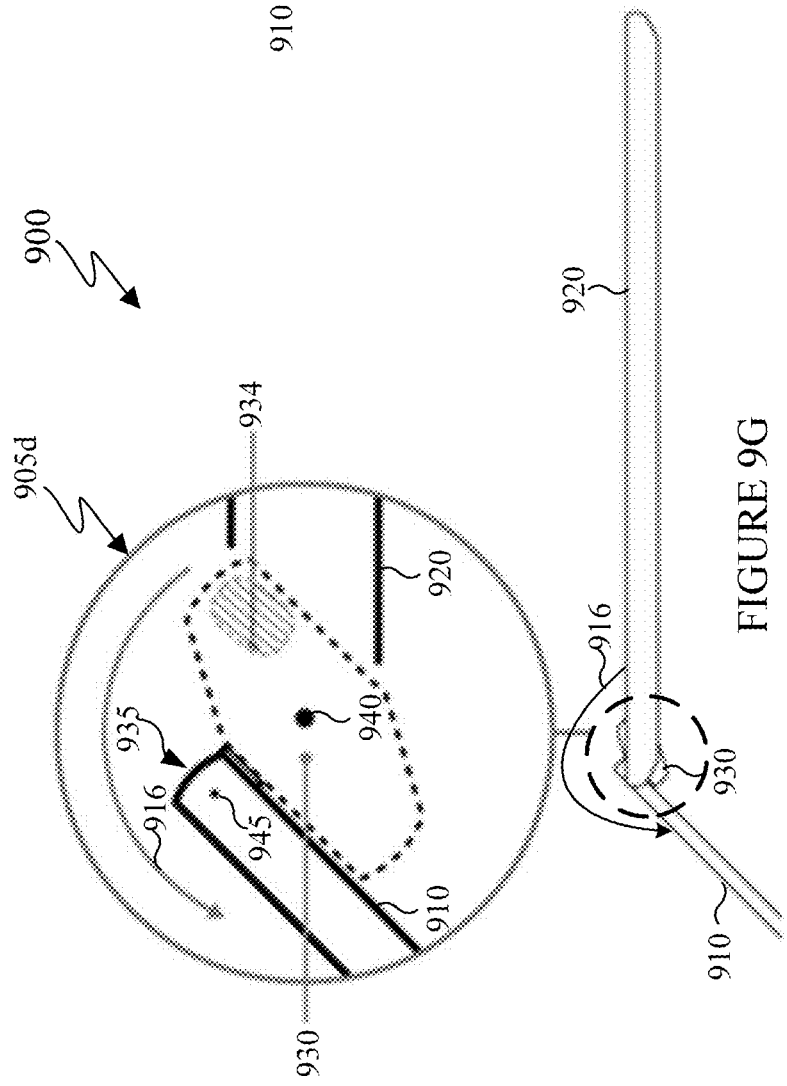

SYSTEM AND METHOD FOR TOUCH INPUT

CROSS-REFERENCE TO RELATED APPLICATION AND CLAIM OF PRIORITY

This application claims priority under 35 U.S.C. § 119(e) to U.S. Provisional Patent Application No. 62/577,309 filed on Oct. 26, 2017, and U.S. Provisional Patent Application No. 62/577,327 filed on Oct. 26, 2017. The above-identified provisional patent applications are hereby incorporated by reference in their entirety.

TECHNICAL FIELD

This disclosure relates generally to an electronic device. More specifically, this disclosure relates to an electronic device with multiple touch screens and a hinge assembly and a user interface thereof.

BACKGROUND

The use of computing technology such as a laptop computing device is greatly expanding, largely due to the usability, convenience, computing power, and the like. Laptop computers are becoming increasingly popular as a result of the devices becoming more compact, while the number of functions performed by a given device, such as features of the device, is increasing. Various electronic devices, such as a laptop computer, often utilize a graphical user interface (GUI) and include a display. The electronic device can output various contents, such as text, images, or the like, through the display. Some displays can also include a touch screen enabling the display to both receive an input form a user and output content to be viewed by a user.

SUMMARY

This disclosure provides systems and methods for touch input.

In a first embodiment, an electronic device is provided. The electronic device includes a housing including a first surface, a second surface, and a third surface. The electronic device also includes a keyboard positioned on a first portion of the second surface. The electronic device further includes a primary display positioned on the first surface, a touch surface display positioned on a second portion of the second surface, a touch bar display positioned on the third surface. The electronic device additionally includes a processor positioned within the housing and operably connected to the keyboard, the primary display, the touch surface display, and the touch bar display. The processor is configured to display a first set of content on the touch surface display. The processor is also configured to receive a first touch input on the touch surface display, the first touch input is associated with a portion of the displayed first set of content. In response to receiving the first touch input on the touch surface display, the processor is additionally configured to perform a first function.

In another embodiment, a method for operating an electronic device including a primary display, a touch surface display, and a touch bar display is provided. The method includes displaying a first set of content on the touch surface display. The method also includes receiving a first touch input on the touch surface display, the first touch input is associated with a portion of the displayed first set of content. In response to receiving the first touch input on the touch surface display, the method further includes performing a first function. The primary display positioned on the first surface of the election device. The touch surface display is positioned on a second portion of a second surface of the electronic device. The touch bar display is positioned on a third surface of the electronic device.

In yet another embodiment a laptop computing device is provided. The laptop computing device includes a first housing including a primary display and back surface, the primary display is opposite the back surface. The laptop computing device also includes a second housing including an input surface and a bottom surface; the input surface is opposite the back surface. The laptop computing device additionally includes a hinge mechanism including a first hinge and a second hinge. The first hinge is coupled to the first housing, the second hinge is coupled to the second housing, and the first hinge is coupled to the second hinge. The hinge mechanism is configured to rotate the first housing from a first position to a second position, in first position the primary display and the input surface are in contact, and in the second position the back surface and the bottom surface are in contact.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A, 5B, and 5C, illustrate an example laptop computing device with a touch surface display receiving a peripheral component in accordance with an embodiment of this disclosure;

FIG. 6A illustrates an example laptop computing device with a touch bar display in accordance with an embodiment of this disclosure;

FIGS. 6B and 6C illustrate an example laptop computing device with a touch surface display and a touch bar display in accordance with an embodiment of this disclosure;

FIGS. 9A, 9B, 9C, 9D, 9E, 9F, 9G, 9H, 9I, 9J, and 9K illustrate an example laptop computing device transitioning from a closed position to a fully open position in accordance with an embodiment of this disclosure.

DETAILED DESCRIPTION

Figure 1:
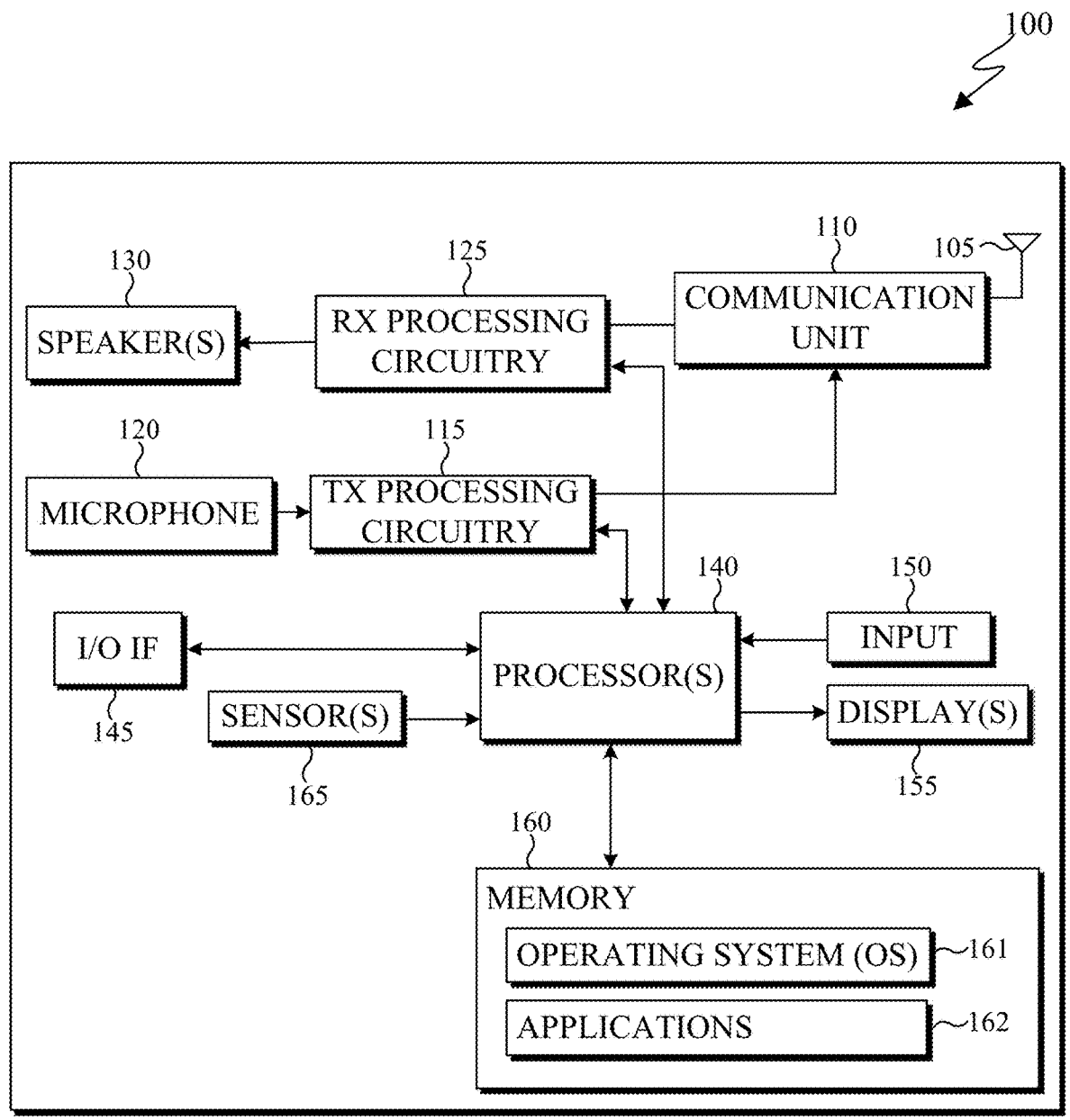
FIG. 1 illustrates an example electronic device in accordance with an embodiment of this disclosure.

FIGS. 1 through 9K, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

According to embodiments of the present disclosure, laptop computers are based on a 'clam shell' configuration, such that a base member is hinged to a display member. The base member can includes a keyboard, a track pad, various ports and connectors, a variety of hardware components, and the like. The display member includes a primary display, such as a graphical user interface, allowing a user to interact with the laptop computer by viewing content on the display. The user can interact with the content via various user input components such as those located on the base member. A hinge connects the display member to the base member. In a closed position the display is in contact with the keyboard, such that the keyboard and the display are not accessible to a user. While in the laptop computer is in an open position, the display is inclined at a desired viewing angle, providing access to the keyboard that is located on the base member.

Certain electronic devices include a graphical user interface (GUI) such as a display that allows a user to view information displayed on the display and interact with the electronic device. According to embodiments of the present disclosure, content displayed on the display screen of a laptop device can include user interface objects such as, icons, images, videos, control elements such as buttons (such as soft buttons) and other graphics, and the like. A user can interact with the user interface objects via a user input device, such as a keyboard, mouse, and a trackpad. If the display is a touchscreen display, a user can interact with the content displayed on the electronic device by simply touching the display via a finger of the user or a stylus. A touch screen can include a touch panel. A touch panel can be a clear panel with a touch-sensitive surface. The touch panel can be positioned in front of a display screen so that the touch-sensitive surface covers the viewable area of the display screen. Touch screens are able to recognize the occurrence of a touch, a type of a touch (such as a tap, a drag, the force of the touch, the time duration of the touch, and the like), and a position of the touch on the display screen with respect to content displayed on the display. The computing system interprets the touch information and thereafter performs an action based on the touch event. For example, if a user touches text, graphics, or icons that are displayed on the touch screen with a finger or stylus, the electronic device detects the selection of the user based on the location, situation, and type of touch. It is noted that as used herein, the term "user" may denote a human or another device (such as an artificial intelligent electronic device) using the electronic device.

An electronic device, according to embodiments of the present disclosure, can include personal computers (such as a laptop, a desktop), a workstation, a server, a television, an appliance, and the like. Additionally, the electronic device can be at least one of a part of a piece of furniture or building/structure, an electronic board, an electronic signature receiving device, a projector, or a measurement device. In certain embodiments, the electronic device can be a portable electronic device such as a portable communication device (such as a smartphone or mobile phone), a laptop, a tablet, an electronic book reader (such as an e-reader), a personal digital assistants (PDAs), a portable multimedia player (PMPs), a MP3 player, a mobile medical device, a virtual reality headset, a portable game console, a camera, and a wearable device, among others. The electronic device is one or a combination of the above-listed devices. Additionally, the electronic device as disclosed herein is not limited to the above-listed devices, and can include new electronic devices depending on the development of technology.

Embodiments of the present disclosure recognize and take into consideration that the various functionalities and processes performed by a laptop computer are increasing. Additionally, embodiments of the present disclosure recognize and take into consideration that limiting the size and weight of a laptop enable the device to be a portable electronic device. For example, the smaller and more compact a laptop is, the more portable the laptop becomes. To decrease the size of a laptop often various user interface button on the keyboard are omitted in order to reduce the size of the overall device. For example, the numeric keypad is often omitted from the side of the keyboard to reduce the length of the keyboard resulting in a smaller chassis of the laptop. As the size of the laptop decreases the omitted user interface buttons removes the ability of a user to quickly access to various features of the laptop computer or user interface components that are associated with the omitted user interface buttons. Additionally, as the complexity of a laptop computer increases, adding additional user inputs to enable quick access to various features that are added to the laptop, can improve usability of the laptop. Similarly, as new features of a user interface are created, adding additional user inputs to enable quick access to the various user interfaces features that are added to the laptop, can also improve usability of the laptop.

Embodiments of the present disclosure also take into consideration that due to the size constraints to maintain the portability aspects of most laptops, various features found on a desktop keyboard are omitted from some laptop keyboards. For example, some laptops omit the numeric keypad. To resolve the absence of a numeric keypad and other user interface buttons, a laptop often uses a single key on the keyboard to perform dual inputs. For example, a first key when tapped can perform a first input, but when the first key is pressed along with another key, such as a function key, a second input is performed. That is, the first key is both a standard key and special key, where the special key is activated by pressing both the first key and the function key on the keyboard. The omission of the numeric keypad and the use of keys that can provide multiple different inputs can provide difficulty for a user to quickly use a laptop keyboard as compared to a larger keyboard.

Therefore, embodiments of the present disclosure provide systems and methods including additional touch screens on a laptop or similar device. In certain embodiments, additional touch input surfaces are included on a laptop to increase the functionality and usability of the laptop. For example, one or more touch input surfaces can be used to perform various operations with the electronic device. The additional touch input surfaces can include display screens. The additional touch input surfaces can be used to display contextual information, various system controls, different applications (such as a numeric keypad), and can be used in a variety of different modes (such as a writing tool), and the like. Similarly, embodiments of the present disclosure provide system and methods for, using two touch surfaces on the laptop to perform various operations of the electronic device, in addition to the primary display that is located on the display member of a laptop. For example, different operations can be performed if a user uses one input or simply touches a second input while performing the first input. Embodiments of the present disclosure provide systems and methods including a touch bar display and a touch surface display in addition to the primary display positioned on the display member.

Embodiments of the present disclosure provide systems and methods for displaying, on the additional touch input surfaces, pictorial representations of peripheral components that are connected to the laptop such as external memory device. The pictorial representations of peripheral components connected to the laptop can also include a user control interface to provide the user additional information about the peripheral component as well as various interactions the user can perform with respect to the peripheral component.

FIG. 1 illustrates an electronic device 100 in accordance with an embodiment of this disclosure. The embodiment of the electronic device 100 shown in FIG. 1 is for illustration only and other embodiments could be used without departing from the scope of this disclosure. The electronic device 100 can come in a wide variety of configurations, and FIG. 1 does not limit the scope of this disclosure to any particular implementation of an electronic device.

The electronic device 100 can be a mobile communication device, such as, for example, a laptop computer, a mobile station, a subscriber station, a wireless terminal, a desktop computer, a portable electronic device such as a mobile device, a PDA, a tablet computer, a wearable device, and the like. In certain embodiments, the electronic device 100 is a laptop computer that includes a GUI with multiple display screens, such as a primary display, a touch surface display, and a touch bar display, as well as one or more applications or programs installed thereon.

As shown in FIG. 1, the electronic device 100 includes an antenna 105, a communication unit 110, a transmit (TX) processing circuitry 115, a microphone 120, and a receive (RX) processing circuitry 125. The communication unit 110 can include, for example, a radio frequency (RF) transceiver such as a BLUETOOTH transceiver, a WI-FI transceiver, ZIGBEE, infrared, and the like. The electronic device 100 also includes a speaker 130, a processor 140, an input/output (I/O) interface (IF) 145, an input 150, a display 155, a memory 160, and a sensor(s) 165. The memory 160 includes an operating system (OS) 161, one or more applications 162.

The communication unit 110 receives, from the antenna 105, an incoming RF signal transmitted such as a BLUETOOTH or WI-FI signal from an access point (such as a base station, WI-FI router, BLUETOOTH device) of a network (such as a WI-FI, Bluetooth, cellular, 5G, LTE, LTE-A, WiMAX, or any other type of wireless network). The communication unit 110 down-converts the incoming RF signal to generate an intermediate frequency or baseband signal. The intermediate frequency or baseband signal is sent to the RX processing circuitry 125 that generates a processed baseband signal by filtering, decoding, or digitizing the baseband or intermediate frequency signal, or a combination thereof. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data from the processor 140. The outgoing baseband data can include web data, e-mail, or interactive video game data. The TX processing circuitry 115 encodes, multiplexes, digitizes, or a combination thereof, the outgoing baseband data to generate a processed baseband or intermediate frequency signal. The communication unit 110 receives the outgoing processed baseband or intermediate frequency signal from the TX processing circuitry 115 and up-converts the baseband or intermediate frequency signal to an RF signal that is transmitted via the antenna 105.

The processor 140 can include one or more processors or other processing devices and execute the OS 161 stored in the memory 160 in order to control the overall operation of the electronic device 100. For example, the processor 140 could control the reception of forward channel signals and the transmission of reverse channel signals by the communication unit 110, the RX processing circuitry 125, and the TX processing circuitry 115 in accordance with well-known principles. The processor 140 is also capable of executing other applications 162 resident in the memory 160. Example, applications 162 include business, calendars, email clients, finance, games, health/fitness, maps/navigation, photography, shopping, travel, utilities, weather, messaging, web browsing, video player, image view, and the like.

Applications 162 can be a repository for multiple applications that are accessible by the electronic device 100. In certain embodiments, one or more applications or programs installed on the electronic device 100. Each of the applications installed on the electronic device 100 can be stored in a locally or remotely. For example, an application can be stored in a memory, such as memory 160 (such as applications 162) or located remotely and accessed via the communication unit 110. The applications installed on the electronic device 100 can access one or more features of the electronic device.

The processor 140 can execute instructions that are stored in a memory 160. The processor 140 can include any suitable number(s) and type(s) of processors or other devices in any suitable arrangement. For example, in some embodiments, the processor 140 includes at least one microprocessor or microcontroller. Example types of processor 140 include microprocessors, microcontrollers, digital signal processors, field programmable gate arrays, application specific integrated circuits, and discreet circuitry The processor 140 is also capable of executing other processes and programs resident in the memory 160, such as operations that receive, store, and timely instruct by providing image capturing and processing. The processor 140 can move data into or out of the memory 160 as required by an executing process. In some embodiments, the processor 140 is configured to execute plurality of applications 162 based on the OS 161 or in response to signals received from eNBs or an operator. The processor 140 is also coupled to the I/O interface 145 that provides the electronic device 100 with the ability to connect to other devices. For example, the electronic device can connect to and receive applications, such as applications 162, from an external device such as a server that contains a repository of applications. The I/O interface 145 is the communication path between these accessories and the processor 140.

The processor 140 is also coupled to the input 150 and the display 155. The operator of the electronic device 100 can use the input 150 to enter data or inputs into the electronic device 100. Input 150 can be a keyboard, touch screen, touch panels, mouse, track ball, track pad, voice input, or other device capable of acting as a user interface to allow a user in interact with electronic device 100. For example, the input 150 can include voice recognition processing thereby allowing a user to input a voice command. In another example, the input 150 can be a gaze detection by a camera directed at an eye of the user. In another example, the input 150 can include one or more touch panels located at different locations on the chassis of the electronic device 100, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 150 can be associated with sensor(s) 165 and/or a camera by providing additional input to processor 140. The input 150 can also include a control circuit. In the capacitive scheme, the input 150 can recognize touch or proximity.

The display 155 can include any number of displays. The display 155 can be located at one or more locations on the electronic device 100. In certain embodiments, the display 155 is a liquid crystal display (LCD), light-emitting diode (LED) display, organic LED (OLED), active matrix OLED (AMOLED), or other display capable of rendering text and/or graphics, such as from websites, videos, games, images, and the like.

The memory 160 is coupled to the processor 140. Part of the memory 160 could include a random access memory (RAM), and another part of the memory 160 could include a Flash memory or other read-only memory (ROM). The memory 160 can include persistent storage (not shown) that represents any structure(s) capable of storing and facilitating retrieval of information (such as data, program code, and/or other suitable information on a temporary or permanent basis). The memory 160 can contain one or more components or devices supporting longer-term storage of data, such as a ready only memory, hard drive, flash memory, or optical disc.

The memory 160 also can contain content. The content can be included in the OS 161, the applications 162, or both. The content can also include various user interface objects such as text, images, video, audio, a simulation, menus, buttons, and the like. In certain embodiments, the processor 140 causes the content to be displayed on the display 155 of the electronic device 100. For example, the content can include additional menu options, contextual data associated with information displayed on the primary display of the display 155. The content can also include soft key, that can perform a number of functions that than being associated with a single fixed functions or set of fixed functions.

Electronic device 100 further includes one or more sensor (s) 165 that can meter a physical quantity or detect an activation state of the electronic device 100 and convert metered or detected information into an electrical signal. For example, sensor 165 can include one or more buttons for touch input, a camera, an optical sensor, a gesture sensor, an inertial/motion sensors (such as a gyroscope or gyro sensor and an accelerometer), an air pressure sensor, a magnetic sensor or magnetometer, a grip sensor, a proximity sensor, altimeter, a color sensor, a bio-physical sensor (such as a heart rate sensor), a temperature/humidity sensor, an illumination sensor, an Ultraviolet (UV) sensor, an Electromyography (EMG) sensor, an Electroencephalogram (EEG) sensor, an Electrocardiogram (ECG) sensor, an infrared (IR) sensor, an ultrasound sensor, an iris sensor, a fingerprint sensor, and the like. The sensor 165 can further include a control circuit for controlling at least one of the sensors included therein. Any of these sensor(s) 165 can be located within the electronic device 100.

Although FIG. 1 illustrates examples of devices in a computing system, various changes can be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). In addition, as with computing and communication networks, electronic devices and servers can come in a wide variety of configurations and FIG. 1 does not limit this disclosure to any particular electronic device or server.

Figure 2:
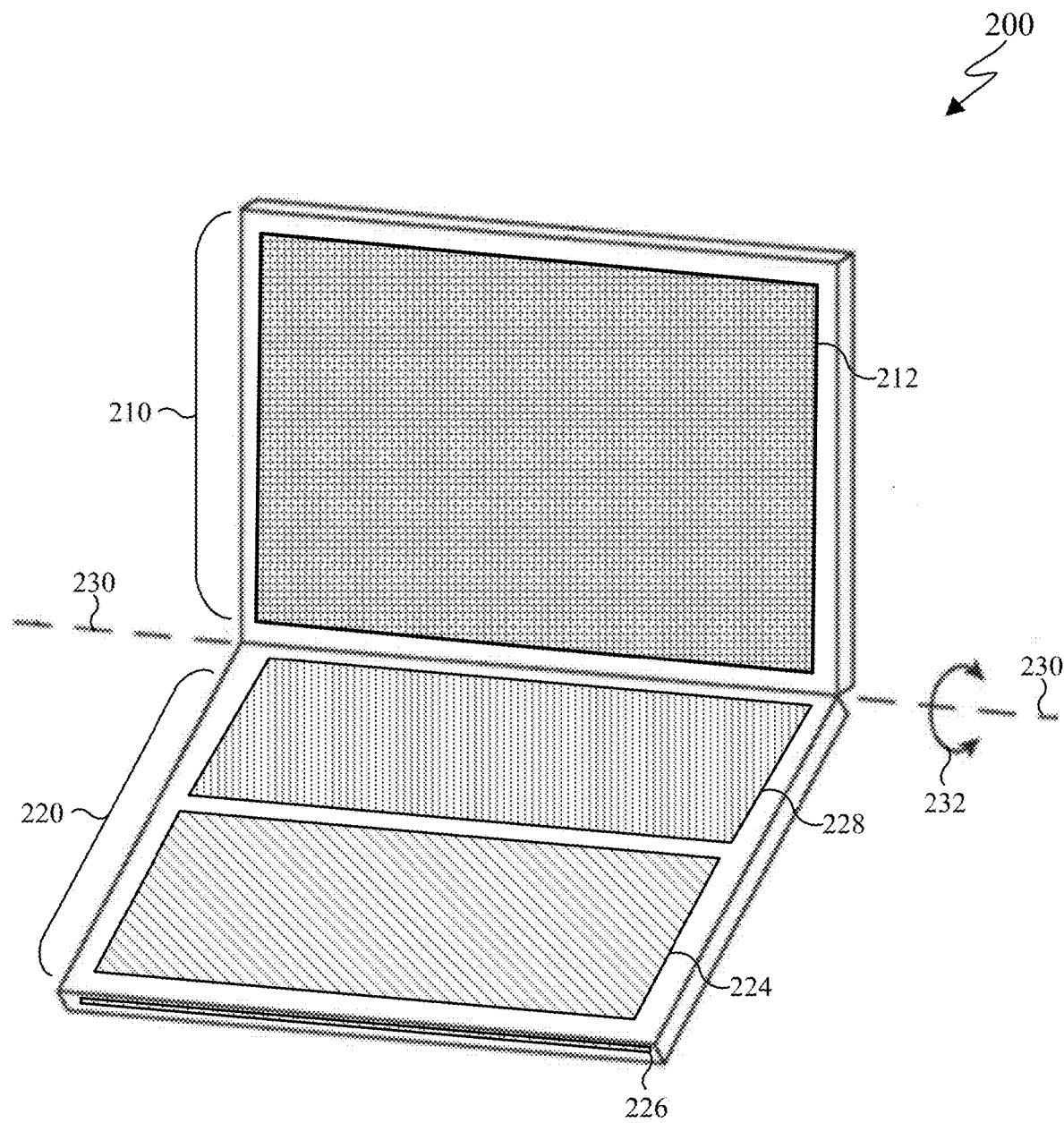
FIG. 2 illustrates an example laptop computing device with multiple displays in accordance with an embodiment of this disclosure.

FIG. 2 illustrates an example laptop computing device 200 with multiple displays in accordance with an embodiment of this disclosure. In certain embodiments, the laptop computing device 200 can include internal components similar to the electronic device 100 of FIG. 1. The embodiment of the laptop computing device 200 shown in FIG. 2 is for illustration only. Other embodiments can be used without departing from the scope of the present disclosure.

The laptop computing device 200 includes a housing with a display member 210 and a base member 220. The display member 210 includes a primary display 212. The primary display 212, displays the user interface that is associated with one or more programs, applications. The displayed user interface can include a home screen with a plurality of icons. The icons can represent programs. The programs can include word processing program, a browser for browsing the internet, photo or video editing programs, image views, multimedia players, to name a few. Opposite the primary display 212 is the lid (not shown) located on the back of the display member 210. The base member 220 includes various user inputs, such as a keyboard 228, a touch surface display 224, and a touch bar display 226. The keyboard 228 can be a set of electro-mechanical keys that when a key is depressed, a certain function is performed. In certain embodiments, the keyboard 228 is a touch surface with keys displayed or imprinted on the surface. The touch surface display 224 is a touch screen that displays content and can receive one or more touch inputs. The touch surface display 224 is positioned below the keyboard towards the touch bar display 226. In certain embodiments, the touch surface display 224 includes a track pad. The touch bar display 226 on the external side perpendicular to the touch surface display 224. For example, when the display member 210 and the base member 220 are on top of each other (such as when the laptop is closed), the touch bar display 226 is remains exposed, while the primary display 212, the keyboard 228 and the touch surface display 2024 are concealed. The touch bar display 226 and the touch surface display 224 are located on different sides of the base member 220. For instance, the top edge of the touch bar display 226 and the bottom edge of the touch surface display 224 can border the bottom edge of the base member 220.

The laptop computing device 200 is illustrated in an open configuration. The laptop is in an open configuration when a user can view the primary display 212 and access the user inputs such as the keyboard 228, the touch surface display 224, and the touch bar display 226. The laptop computing device 200 can rotationally open or close along axis 230 as indicated by rotation 232. That is, the primary display can rotationally pivot and come in contact with the keyboard 228 and the touch surface display 224. The display member 210 and the base member 220 can be connected by a hinge that enables the rotation 232 along the rotational axis 230. The hinge is discussed in further detail below with respect to FIGS. 8, 9A through 9K.

In certain embodiments, the length and width of the display member 210 is equivalent to the length and width of the base member 220. For example, when the display member 210 is positioned flat and on top of the base member 220, the edges of the display member 210 and the base member 220 line up. The primary display 212 is the size of the display member 210 or smaller than the display member 210. The length and width of the keyboard 228 and the touch surface display 224 can be equivalent. It is noted that the width is parallel to the rotational axis 230, while length is perpendicular to the rotational axis 230. Alternatively, the length and width of the keyboard 228 and the touch surface display 224 can vary. For example, example, the width of the keyboard 228 and the touch surface display 224 can be equivalent, while the length is not equivalent. For instance, the keyboard 228 can be positioned to occupy two-thirds of the base member 220 while the touch surface display 224 occupy one-third of the base member 220. In another example, the width of the keyboard 228 and the touch surface display 224 can vary. For example, the touch surface display 224 can extend beyond the length of the keyboard 228. In certain embodiments, the location of the touch surface display 224 and the keyboard 228 are switched.

In certain embodiments, the width of the touch bar display 226 is equivalent to the touch surface display 224. For example, the touch bar display 226 and the touch surface display 224 are the same length but on different abutting sides of the base member 220. In certain embodiments, the width of the touch bar display 226 is longer or shorter than the width of the touch surface display 224. The width of the touch bar display 226 can be the same, longer or shorter than the width of the keyboard. The height of the touch bar display 226 can be the entire height of the base member or a portion of the height of the base member.

Figure 3:
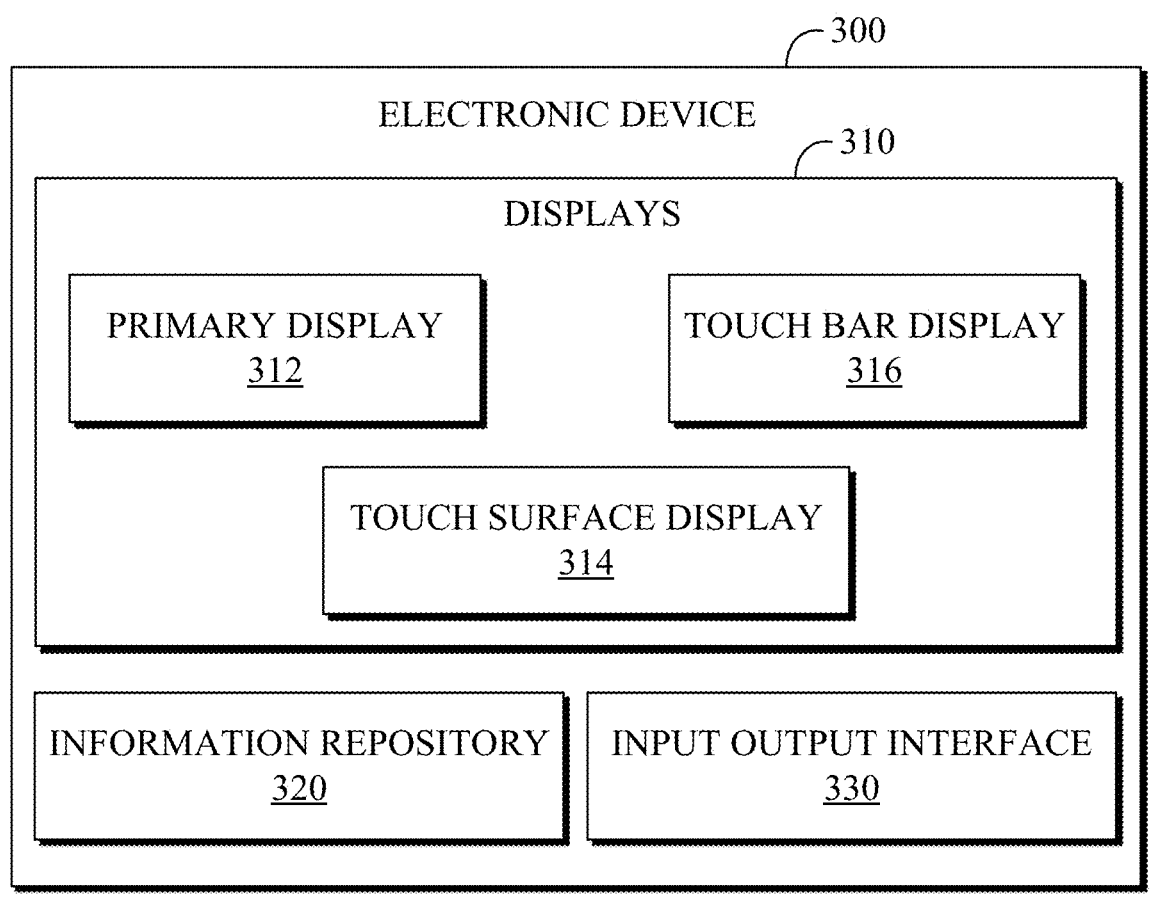
FIG. 3 illustrates an example block diagram of an electronic device in accordance with an embodiment of this disclosure.

FIG. 3 illustrates an example block diagram of an electronic device 300 in accordance with an embodiment of this disclosure. The embodiment of the electronic device 300 shown in FIG. 3 is for illustration only. Other embodiments can be used without departing from the scope of the present disclosure.

The electronic device 300 illustrates a high-level overview of an embodiment of the present disclosure. In certain embodiments, the electronic device 300 is a laptop. Additional examples of the electronic device 300 includes a desktop computer, a tablet computer, a cellular phone, a PDA, an image sensing device such as a digital camera, a gaming device, a music storage and playback device, a household appliance capable of wireless Internet access and web browsing, and a portable unit or terminal integrating the functions of the aforementioned items.

The electronic device 300 is similar to the laptop computing device 200 of FIG. 2 and can include internal components similar to the electronic device 100 of FIG. 1. The electronic device 300 includes displays 310, an information repository 320, and an input output (I/O) interface (IF) 330.

In certain embodiments, the electronic device 300 is connected to one or more servers to download and receive applications, notifications, information, update information for applications installed on the electronic device 300, and the like. For example, the electronic device 300 can include components allowing the electronic device 300 to access one or more networks. The electronic device 300 can access networks in order to acquire an application from one or more application manufacturers or developers. The network can be personal area network (PAN), Local Area Networks (LANs), Wireless Local Area Networks (WLANs), the Internet, the Public Switched Telephone Network (PSTN), as well as other wireless networks. The network may also be the Internet representing a worldwide collection of networks and gateways that use Transmission Control Protocol/Internet Protocol (TCP/IP) protocols to communicate with one another. The network can include a cable, a router, switches a firewall, or a combination thereof. The network can include a variety of connections, such as, wired, wireless or fiber optic connections.

The displays 310 include a primary display 312, a touch surface display 314, and a touch bar display 316. The primary display 312 can be similar to the primary display 212 of FIG. 2 and the display 155 of FIG. 1. The touch surface display 314 can be similar to the touch surface display 224 of FIG. 2. The touch bar display 316 can be similar to the touch bar display 226 of FIG. 2. The touch surface display 314 and the touch bar display 316 can be similar to the I/O IF 145, the display 155 FIG. 1, or both.

The primary display 312 is a single display affixed to the electronic device 300. In certain embodiments, the primary display 312 includes multiple displays. For example, one or more displays of the primary display 312 are external to the electronic device 300. The primary display 312 can be similar to a display screen on mobile device, or a display screen on a computer or tablet. In certain embodiments, primary display 312 is a user interface allowing the user to provide one or more inputs with respect to displayed content. The primary display 312 cam display various user interface objects such as icons, images, videos, and control elements such as buttons, graphics, and other visual indications, and the like. The user interface objects allows a user the ability to interact with the various functionalities provided by the electronic device 300 such as taking a picture, word processing, drafting reading and sending e-mails, playing games, selecting music or a video to be played, and the like. In certain embodiments, the primary display 312 is includes a touchscreen that allows a user to directly interact with the electronic device 300 via a finger of the user or a stylus.

The touch surface display 314 is a touch display screen, such as when a touch panel and a display screen are overlaid. In certain embodiments, the touch surface display 224 is positioned at the palm rest of a laptop when the user is typing on a keyboard (similar to the keyboard 228 of FIG. 2). The position and placement of the touch surface display 224 can vary. In certain embodiments, when the touch surface display 224 is inactive or a portion of the touch surface display 224 is inactive, the touch surface display 224 can display a color that matches the housing of the electronic device 300, such as the base member 220 or the display member 210 of FIG. 2. The content displayed on the touch surface display 224 can change and correspond to one or more functions or commands. For example, a numeric keypad can be displayed on the touch surface display 224. In another example, the touch surface display 224 can become a surface that the user can write on with a finger or a stylus. In another example, the touch surface display 224 can display various tools for drawing or manipulating content. The content can be displayed on the primary display 312.

In certain embodiments, the touch surface display 224 includes a touch pad. The size and shape of the touch pad are customizable based on one or more user inputs or predetermined settings. A touch pad is an I/O IF 145 that is an X-Y input device. That is a touch pad sends X and Y coordinate values to the electronic device 300. A touch pad is a touch sensitive area that detects and convers movements of a finger of a user (or a stylus) to movement of a cursor on the primary display 212. That is, a touch pad is used to guide and control the location of a curser displayed on the primary display 312.

The touch bar display 316 is a display that can include certain user input features. For example, the touch bar display 316 can include volume control, such as increasing, decreasing or muting the volume. In another example, the touch bar display 316 can display media playback controls when media is being played on the electronic device 300. For instance, if the electronic device 300 is playing music of a video, the touch bar display 316 can display various controls such as, pause, play, stop, fast forward, rewind, and the like. In another example, the touch bar display 316 can display brightness control, for adjusting the brightness of the primary display 312, the touch surface display 314, the touch bar display 316, or any combination thereof. In another example, the touch bar display 316 can display various function keys such as SHIFT, ALT, CTRL, WIN-KEY, FN, and the like. Additionally, if the user provides an input on the touch bar display 316 (such as touching the CTRL key), different inputs can be displayed on the touch surface display 314, the keys on the keyboard can perform different function, or both. For example, if the user touches the CTRL button on the touch bar display 316, the touch surface display 314 can display various functions such as 'copy,' 'paste,' 'undo,' 'redo,' 'print,' and various other quick command. Similarly, if the user touches the CTRL button on the touch bar display 316, the user can then tap a key on the keyboard to perform a secondary input with respect to that key.

In certain embodiments, the touch surface display 224 and the touch bar display 226 are touch sensitive. In certain embodiments, touch surface display 224 and the touch bar display 226 include a proximity sensor such that the touch surface display 224 and the touch bar display 226 can detect the proximity of the finger of the user with respect to each surface as an input.

The information repository 320 can be similar to memory 160 of FIG. 1. The information repository 320 represents any structure(s) capable of storing and facilitating retrieval of information (such as data, program code, or other suitable information on a temporary or permanent basis). The information repository 320 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc.

The I/O IF 330 is similar to the I/O IF 145 of FIG. 1. The I/O IF 330 can include one or more input ports that allow external components to be operably connected to the electronic device 300. The external components can be physically connected or wirelessly connected to the electronic device 300. In certain embodiments, the various I/O IF 330 include a USB connection port, an SD connection port, a data port, audio input or output connection port (such as microphone or speakers), video connection port, or other electrical hardware port that is configured to transmit or receive signals or data. The I/O IF 330 can also include a power connection port that is configured to receive electrical power from an external source such as a wall outlet or other power source. The electrical power from the external source can be used to power the electronic device 300 or charge a battery that powers the electronic device 300.

Figure 4A:
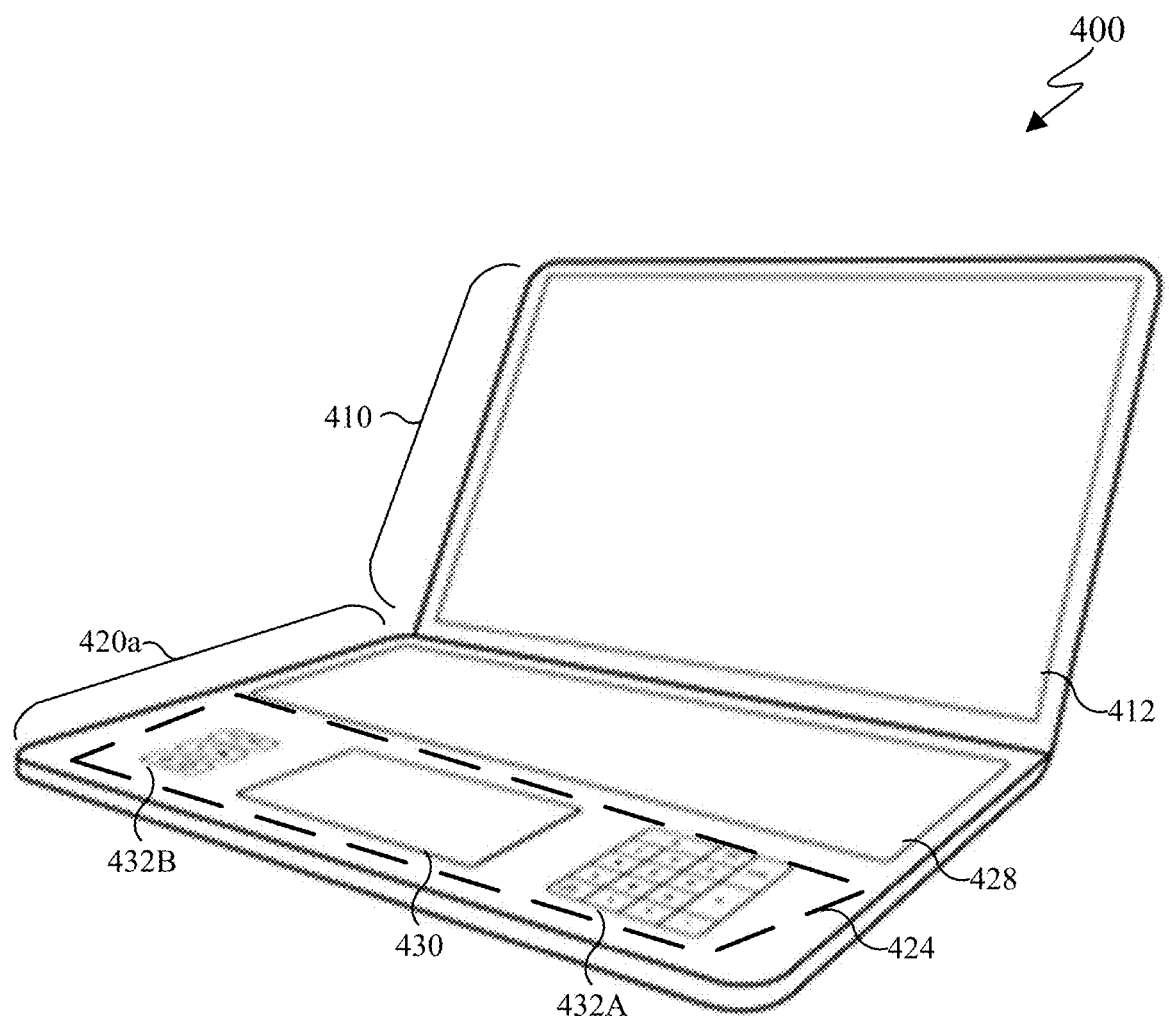
FIG. 4A illustrates an example laptop computing device with a touch surface display in accordance with an embodiment of this disclosure.

FIG. 4A illustrates an example laptop computing device 400 with a touch surface display in accordance with an embodiment of this disclosure. In certain embodiments, the laptop computing device 400 can be similar to the electronic device 300 of FIG. 3, the laptop computing device 200 of FIG. 2, and can include internal components similar to the electronic device 100 of FIG. 1. The embodiment of the laptop computing device 400 shown in FIG. 4 is for illustration only. Other embodiments can be used without departing from the scope of the present disclosure.

The laptop computing device 400 includes housing with a display member 410 and a base member 420a. The display member 410 is similar to the display member 210 of FIG. 2 and the base member 420a is similar to the base member 220 of FIG. 2. The display member 410 includes a primary display 412. The primary display 412 is similar to the primary display 312 of FIG. 3 and the primary display 212 of FIG. 2. The base member 420a includes various user inputs, such as a keyboard 428, a touch surface display 424. The keyboard 428 is similar to the keyboard 228 of FIG. 2. The touch surface display 424 is similar to the touch surface display 314 of FIG. 3 and the touch surface display 224 of FIG. 2.

The touch surface display 224 includes three displayed user interface elements. In particular the touch surface display 224 includes a touch pad 430, a first element 432a, and a second element 432b. The three elements (the touch pad 430, the first element 432a, and the second element 432b) can be configurable and change shape, position, and size on the touch surface display 424. In certain embodiments, more or less elements can be included.

In certain embodiments, the first element 432a can be a numeric touch pad. A numeric keypad can be a 17 key section of a keyboard and is similar to a calculator style numeric input. For example, a numeric keypad can include digits '0' to '9' can include various mathematical operations such as addition, subtraction, multiplication and division. In certain embodiments, more or less mathematical operations can be included such as exponentials, logarithms, and the like.

The second element 432b can include different shortcut buttons. For example, the second element 432b can be assigned by a user. In another example, the second element 432b can be predefined based on the program displayed on the primary display 412. That is, if a word processing program is displayed on the primary display 412, then the second element 432b can include one grouping. Whereas, if a video editing program is displayed on the primary display 412, then another set of the second element 432b is displayed on the touch surface display 224. If a peripheral component inserted into an input port on the laptop computing device 400, the second element 432b can display information associated with the peripheral component.

Figure 4B:
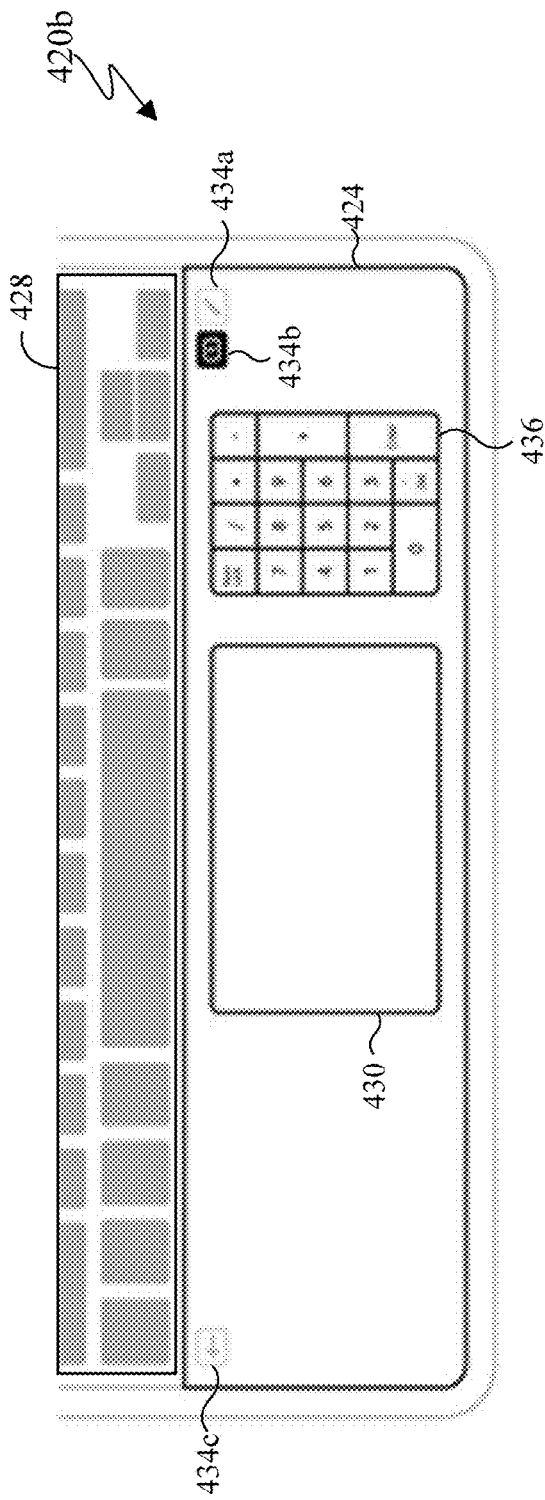
FIGS. 4B, 4C, and 4D illustrate an example base member of a laptop computing device with a touch surface display in different modes in accordance with an embodiment of this disclosure.
Figure 4C:
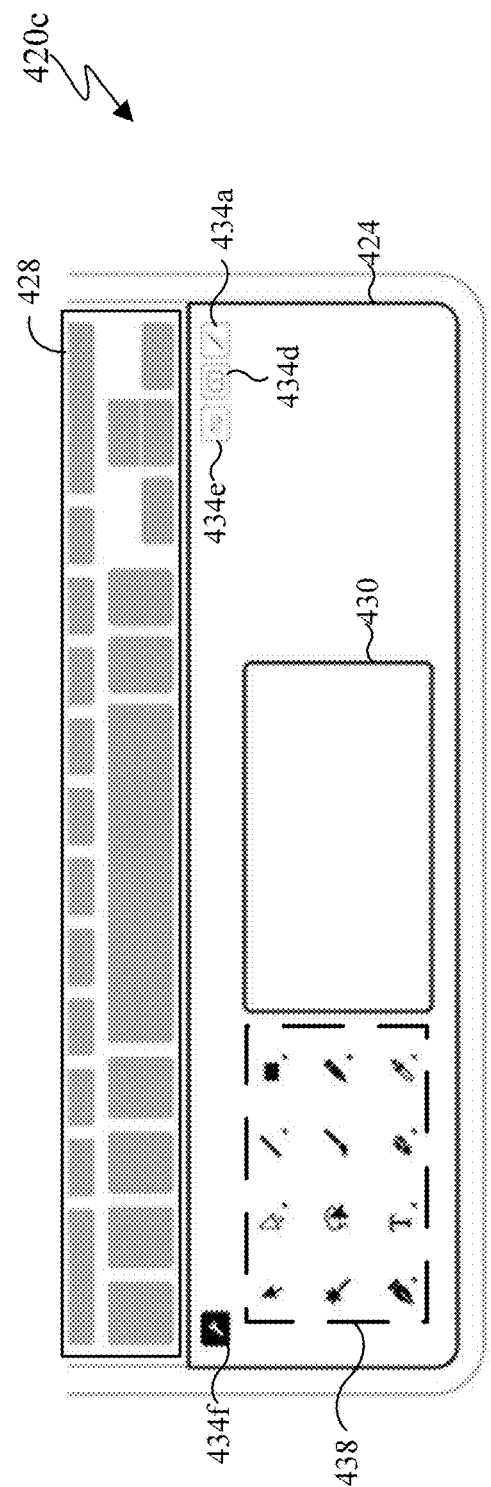
Figure 4D:
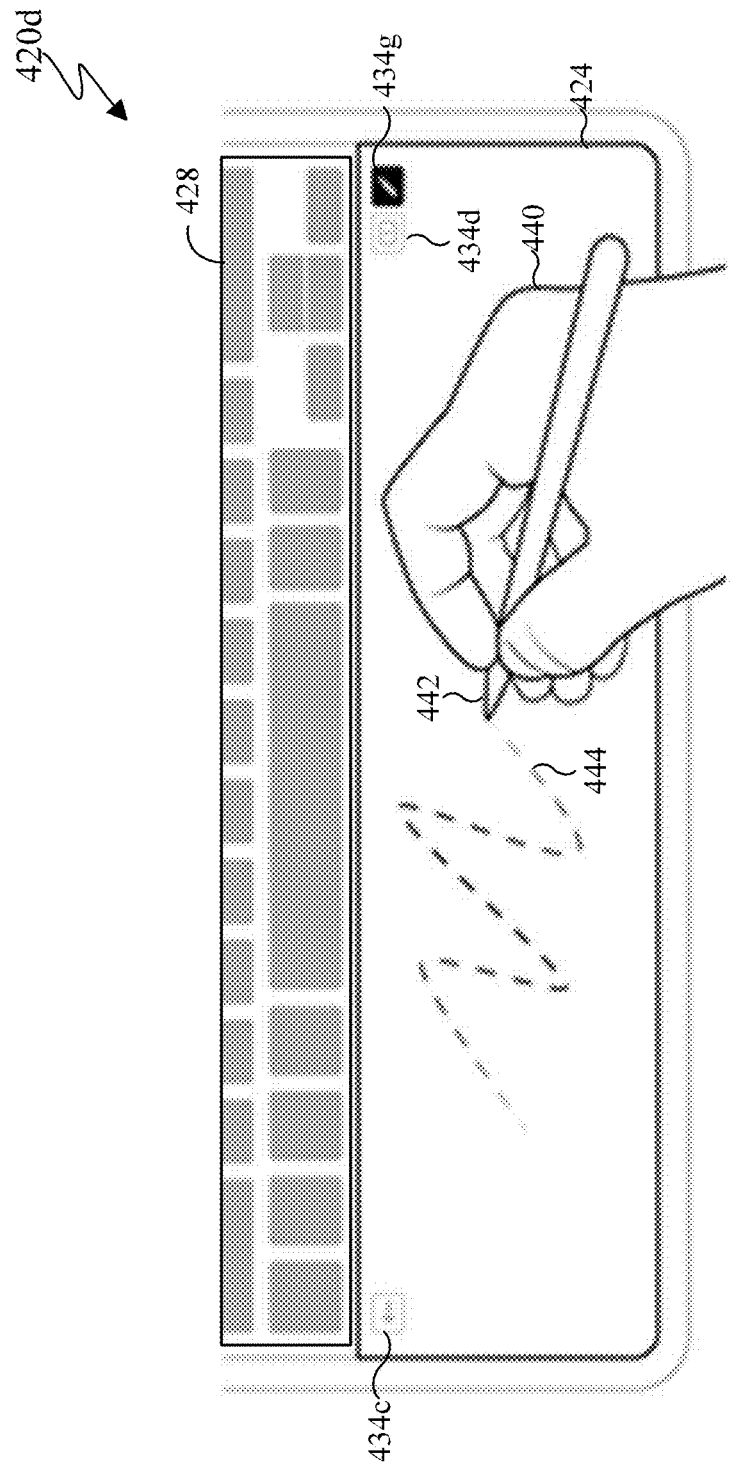

FIGS. 4B, 4C, and 4D illustrate example base members 420b, 420c, and 420d, respectively. The base members 420b, 420c, and 420d depict various modes of the laptop computing device 400 (of FIG. 4A). The base members 420b, 420c, and 420d, are similar to the base member 420a if FIG. 4A and base member 220 of FIG. 2. Each base members 420b, 420c, and 420d include a touch surface display 424 that is similar to the touch surface display 424 (of FIG. 4A). The base members 420b, 420c, and 420d can include internal components similar to the electronic device 100 of FIG. 1. The embodiment of the base members 420b, 420c, and 420d shown in FIGS. 4B, 4C, and 4D respectively, are for illustration only. Other embodiments can be used without departing from the scope of the present disclosure.

The base members 420b, 420c, and 420d include a keyboard 428, and a touch surface display 424. Each of the base members (base members 420b, 420c, and 420d) depict various embodiments of the touch surface display 424. For example, the base member 420b of FIG. 4B depicts a touch pad 430 and a numeric keypad 436. In another example, the base member 420c of FIG. 4C depicts the touch pad 430 (similar to the touch pad 430 if FIG. 4B) and a tools palette 438. In another example, the base member 420C of FIG. 4C depicts the entirety of the touch surface display 424 as a user input for handwriting or drawing.

The base member 420b, of FIG. 4B, depicts the touch surface display 424 with mode selectors 434a, 434b, and 434c. The mode selector 434a is the writing mode and described in greater detail with respect to FIG. 4D below. The mode selector 434b when select displays the numeric keypad 436 on the touch surface display. The mode selector 434c when selected, activates another mode or returns the touch surface display 434 to a previous mode. For example, the mode selector 434c (or any other mode selector) can lock the touch surface display 434 preventing the user from inadvertently providing an input. For instance, when the user is typing on the keyboard, the palms of the user can rest on the touch surface display 424. By locking the touch surface display, prevents an unintentional touch input.

In certain embodiments, the touch surface display 424 can include a sensor that detects when the palms of a user are resting on the touch surface display 424, such as when a user is typing on the keyboard, and is not intending to provide an input on the touch surface display 424. When the touch surface display 424 detects that the palms of the user are resting on the touch surface display 424, and not providing a direct input, the touch surface display 424 can temporarily deactivate the touch surface of the touch surface display 424. By deactivating the touch surface display 424, the laptop computing device 400 does not incorrectly provide an input when the user did not intended to provide an input on the touch surface display 424. The touch surface display 424 can detect when the positioning of the palms of the user change such that the user is not typing on the keyboard and reactivate the touch surface display 424 to receive touch inputs.

When selected, a mode selector can turn a different color. For example, mode selector 434a and mode selector 434c include a white background, while mode selector 434b includes a dark background. The dark background indicates that the mode selector 434b is selected while the mode selector 434a and 434c are not selected. In certain embodiments, when the mode selector 434b is activated, a numeric keypad 436 is displayed on the touch surface display 424. The user can provide inputs to the laptop computing device by the keyboard 428, the touch pad 430, or the numeric keypad 436. In certain embodiments, the user can adjust the size, shape, position, color, or a combination thereof of the touch pad 430 or the numeric keypad 436.

The base member 420c, of FIG. 4C, depicts the touch surface display 424 with mode selectors 434a, 434d, 434e, and 434f. The mode selector 434a of FIG. 4C is the same as the mode selector 434a of FIG. 4B. The mode selector 434d is similar to mode selector 434b of FIG. 4B. In particular, the mode selector 434b of FIG. 4B is selected and a numeric keypad is displayed on the touch surface display while the mode selector 434d of FIG. 4C is not selected. In certain embodiments, the mode selector 434e is another mode selector. In certain embodiments, the mode selector 434e is similar to the TAB key on a keyboard. In certain embodiments, the mode selector 434e allows a user to scroll through a list of additional modes not illustrated on the touch surface. For example, a user can dock certain modes on the touch surface display 424, while other modes are hidden. By selecting the mode selector 434e, the user can bring up an indicator of one or more additional modes not shown on the touch surface display 424.

The mode selector 434f is a tool palette mode. When the mode selector 434f is activated, tool palette 438 is displayed on the touch surface display 424. The tool palette 438 is a GUI element that is used to group one or more functions in an application. For example, the tool palette 438 can include various user input tools for drawing, or a variety of other user input tools. In certain embodiments, the tool palette 438 can be a suite of tools or functions that are arranged in a specific group. If multiple tool groups are associated with the tool palette mode, then user can scroll through and select which tool palette to that is to be utilized.

In certain embodiments, various tool palette 438 can be associated with particular programs on the laptop, such as the laptop computing device 400 of FIG. 4A. For example, one or more tools included in the tool palette 438 can be used for image or video editing software. The tool palette 438 can also include one or more shortcuts assigned by the user or preprogrammed. For example, a shortcut can include a copy function, a paste function, an undo function, a redo function, a print function, and the like.

The base member 420d, of FIG. 4D, depicts the touch surface display 424 with mode selectors 434g, 434d, and 434c. The mode selector 434c, of FIG. 4D, is the same mode selector 434c of FIG. 4B. Similarly, the mode selector 434d, of FIG. 4D, is the same mode selector 434d of FIG. 4C. The mode selector 434a of, FIG. 4B, is similar as the mode selector 434g of FIG. 4D. In particular, the mode selector 434g of FIG. 4D is the activated while the mode selector 434a of FIG. 4B is not activated. When the mode selector 434g of FIG. 4D is activated, any elements displayed on the touch surface, such as the touch pad 430 of FIGS. 4B and 4C, the numeric keypad 436 of FIG. 4B, and the tool palette of FIG. 4C are removed.

The mode selector 434g is a writing mode. When the mode selector 434g is activated, the touch surface display 424 becomes opaque, such that a user 440 can write or draw, such as an input 444, on the touch surface display 424 via a finger, a stylus 442, or the like. The input 444 can be handwritten text or a drawing. The laptop computing device 400 can convert handwritten text through an optical character recognition (OCR) as an input into a word processing program. Additionally, the laptop computing device 400 can insert the drawing as drawn by the user 440 into a file. The drawing can be inserted into a word processing program, a drawing program, and the like. The drawing can also be a signature of the user and inserted into a document or file. In certain embodiments, when the user 440 provides an input on the touch surface display 424, the touch surface display 424, can display a representation of the input, such as input 444.

FIGS. 5A, 5B, and 5C, illustrate an example laptop computing device 500 with a touch surface display receiving a peripheral component in accordance with an embodiment of this disclosure. In certain embodiments, the laptop computing device 500 can be similar to the laptop computing device 400 of FIG. 4, the electronic device 300 of FIG. 3, the laptop computing device 200 of FIG. 2 and can include internal components similar to the electronic device 100 of FIG. 1. FIGS. 5A, 5B, and 5C depict a portion of a base member similar to the base member 420a of FIG. 4A, the base member 220 of FIG. 2. The embodiment of the laptop computing device 500 shown in FIGS. 5A, 5B, and 5C are for illustration only. Other embodiments can be used without departing from the scope of the present disclosure.

FIGS. 5A, 5B, and 5C include a touch surface display 524a, 524b, and 524c, respectively. The laptop computing device 500 also includes keyboard 528. The laptop computing device 500 includes multiple ports, such as USB port 522a and micro SD port 522b (collectively "ports 522"). The laptop computing device 500 can include additional ports 522 (not shown) that allows the laptop computing device 500 to connect to peripheral components or devices such as a power port, and input/output devices including but not limited to speaker(s), microphone(s), printer(s), other electronic devices such as a smart phone, information repositories such as a memory card or external memory device, camera(s), display screen(s) such as external monitors, a mouse, a keyboard, and the like. The ports can be a variety of shapes and perform a various functions such as USB, DVI, eSATA, PS/2, Serial, FireWire, VGA, SCSI, TOSLINK, telephone, Ethernet, HDMI, D-Sub, DB-25, and the like. The USB port 522a is configured to receive a USB plug 530a. The micro SD port 522b is configured to receive a micro SD card 532a. The ports 522 are similar to the I/O IF 145 of FIG. 1 and the input output interface 330 of FIG. 3. In certain embodiments, the ports 522 are physically located on the base member of the laptop computing device 500, similar to the base member 220 of FIG. 2. In certain embodiments, the ports 522 are physically located on the display member of the laptop computing device 500, similar to the base member 220 of FIG. 2. In certain embodiments, the ports 522 are wireless ports, such that one or more devices can connect to the laptop computing device wirelessly through WI-FI, BLUETOOTH, Near Field Communication (NFC), and the like.

FIG. 5B illustrates the USB plug 530a inserted into the USB port 522a. When the USB plug 530a inserted into the USB port 522a, the touch surface display 524b displays the information 540a. In certain embodiments, the information 540a is positioned at or near the location of the USB port 522a. The information 540a can include various contextual data associated with the USB plug 530a. The contextual data can include available memory, connection speed, content included in the USB plug 530a, and the like. The information 540a can also include one or more functions. The functions can include the ability to safely remove the USB plug 530a from the USB port 522a, select specific content to transfer to or from the laptop computing device to the USB plug 530a, and the like.

Similarly, FIG. 5C illustrates the micro SD card 532a inserted into the micro SD port 522b of FIG. 5A. When the micro SD card 532a is inserted into the micro SD port 522b, the touch surface display 524c displays information 540b. In certain embodiments, the information 540b is similar to the information 540a of FIG. 5C.

Figure 6C:
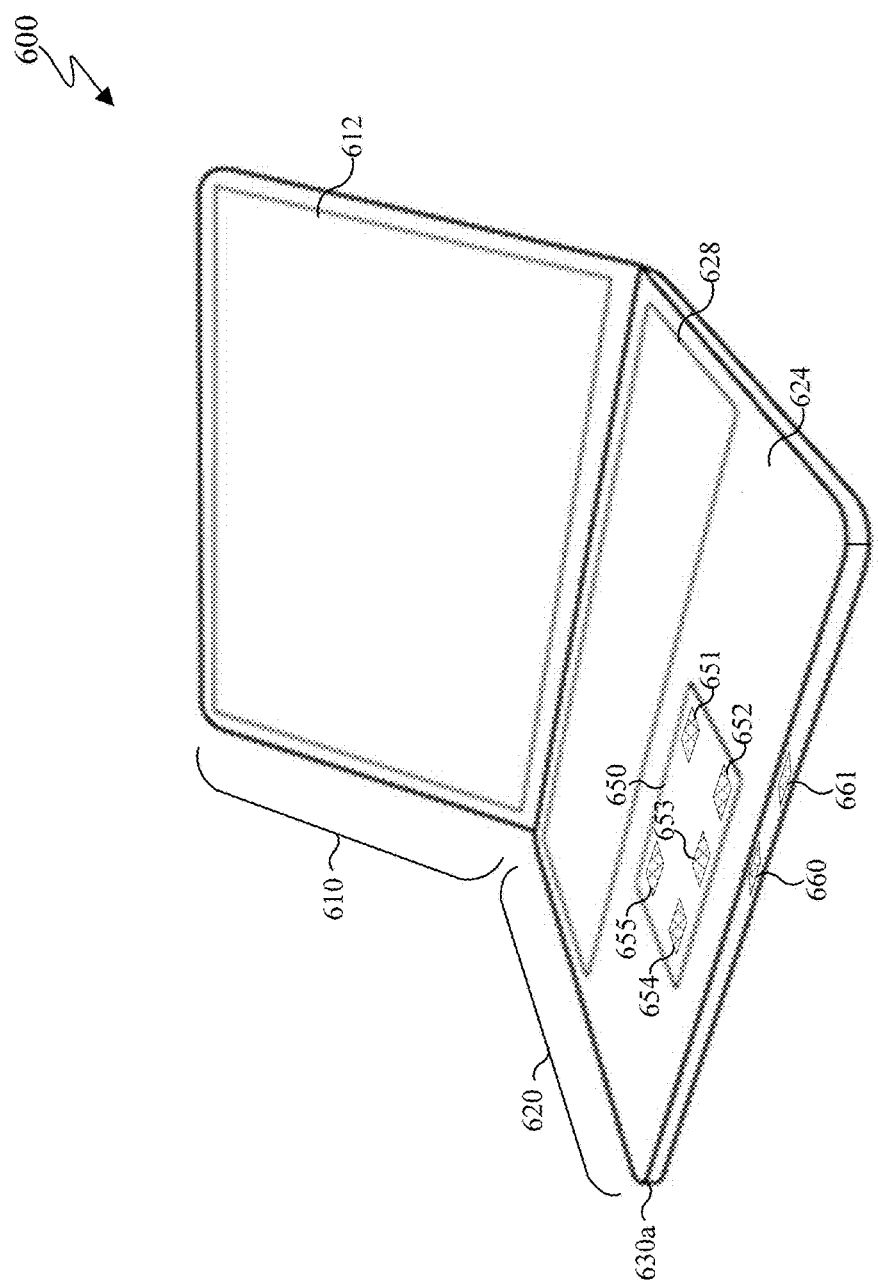

FIG. 6A illustrates an example laptop computing device 600 with a touch bar display in accordance with an embodiment of this disclosure. FIGS. 6B and 6C illustrate an example laptop computing device 600 with a touch surface display and a touch bar display in accordance with an embodiment of this disclosure. The laptop computing device 600 is similar to the laptop computing device 500 of FIGS. 5A-5C, the laptop computing device 400 of FIGS. 4A-4D, the electronic device 300 of FIG. 3, the laptop computing device 200 of FIG. 2 and can include internal components similar to the electronic device 100 of FIG. 1. The embodiment of the laptop computing device 600 shown in FIGS. 6A, 6B, and 6C are for illustration only. Other embodiments can be used without departing from the scope of the present disclosure.

The laptop computing device 600 includes a display member 610. The display member 610 is similar the display member 410 of FIG. 4A, the display member 210 of FIG. 2. The display member 610 includes a display 612. The display 612 is similar to the primary display 412 of FIG. 4A, the primary display 312 of FIG. 3, and the primary display 212 of FIG. 2. The laptop computing device 600 includes a base member 620. The base member 620 is similar to the base member 420a is similar to the base member 220 of FIG. 2. The base member 620 includes touch surface display 624 and touch bar display 630. The touch surface display 624 is similar to the touch surface display 524 of FIGS. 5A-5C, the touch surface display 424 of FIG. 4A-4D, the touch surface display 314 of FIG. 3 and the touch surface display 224 of FIG. 2. The touch bar display 630 is similar to the touch bar display 316 of FIG. 3 and the touch bar display 226 of FIG. 2. FIG. 6C also includes keyboard 628. The keyboard 628 is similar to the keyboard 528 of FIGS. 5A-5C, the keyboard 428 of FIGS. 4A-4D, and the keyboard 228 of FIG. 2.

FIG. 6A illustrates the touch bar display 630 with a plurality of user interface buttons (such as function keys 632a, 633a, 634a, 635a, and 636a) and control elements (such as volume adjuster 631a and brightness adjuster 637a). In certain embodiments, the user interface buttons and the control elements are touch input based. The user interface buttons (632a, 633a, 634a, 635a, and 636a) can for example be one or user interface buttons such as SHIFT, ALT, CTRL, WINKEY, FN, and the like. More or less user interface buttons can be displayed on the touch bar display 630. In certain embodiments, the control elements, such as volume adjuster 631a and brightness adjuster 637a, are customizable such that the control elements can be repositioned, moved, or removed from the touch bar display 630. The user can through a touch input increase or decrease the volume via the volume adjuster 631a or increase or decrease the brightness via the brightness adjuster 637a.

FIGS. 6B and 6C illustrate a user 640 touching one of the user interface buttons. In particular the user 640 touches the function key 634a, of FIG. 6A0, at touch input 634b. In certain embodiments, when the function key 634a is touched at touch input 634b, a particular function is executed on the laptop computing device 600. For example, a particular program can be opened (such as a calculator, a web browser, an email client, a word processing document, a photo editing program, and the like). In another example, when the function key 634a is touched at touch input 634b, no function is executed on the laptop computing device 600. For example, certain user interface buttons, such as function key 634a, requires one or more additional inputs, such as one touch input at touch input 634b and another input on the touch surface display 624. Two separate touches occur in order to perform a function. In certain embodiments, the two separate touches occur at or near the same time instance. In certain embodiments, the touch input 634b is a press and hold, which is held until the second touch input occurs. In certain embodiments, each touch input occurs within a predetermined time interval.

In certain embodiments, touching function key 634a changes the content displayed on the touch surface display 624. For example, FIG. 6C illustrates the touch bar display 630a with touch input buttons 660 and 661, and the When the touch input button 660 is touched by a user, one or more user interface buttons (such as user interface buttons 651, 652, 653, 654, and 655) are displayed on the touch surface display 624. In certain embodiments, if a user touches user interface button 661 the same or different user interface buttons (such as user interface buttons 651, 652, 653, 654, and 655) are displayed on the touch surface display 624. The user interface buttons 651, 652, 653, 654, and 655 can display the name of a command. For example, if a user touches touch input buttons 660, the user interface buttons can display 'cut,' 'copy,' 'paste,' 'undo,' and 'redo' user interface buttons 651, 652, 653, 654, and 655, respectively. When a user then touches the user interface button 653 (for pasting) the content is pasted at the location of the curser. In certain embodiments, the user interface buttons 651, 652, 653, 654, and 655 are displayed on the touch pad 650. Thereby a user can use the touch pad 650 to move the cursor to a particular location on the display 612, then touch the touch input button 660 and the user interface button 653 paste content at a desired location.

Figure 7:
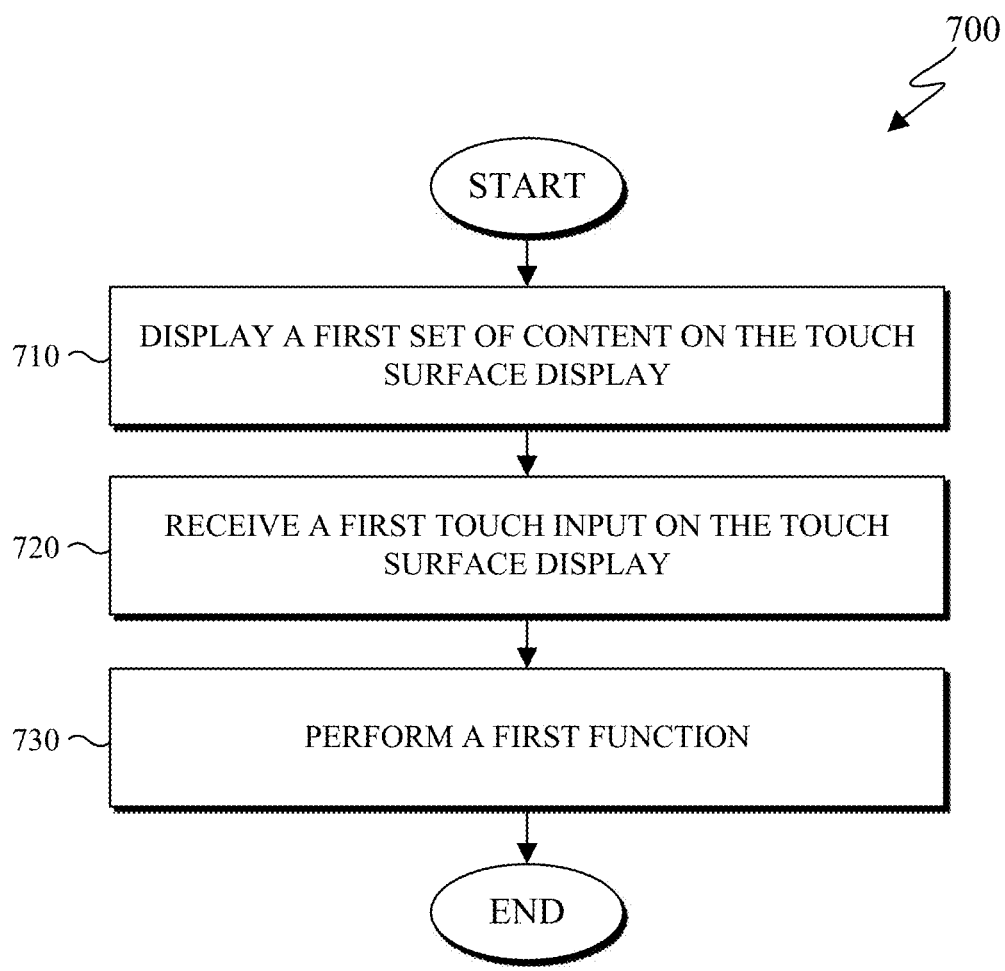
FIG. 7 illustrates a method for operating an electronic device with a touch surface display and a touch bar display in accordance with an embodiment of this disclosure.

FIG. 7 illustrates a method 700 for operating an electronic device with a touch surface display and a touch bar display in accordance with an embodiment of this disclosure. While method 700 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method for operating an electronic device including a primary display, a touch surface display, and a touch bar display is performed by the processor 140 of FIG. 1 that is housed in the laptop computing device 200 of FIG. 2, the electronic device 300 of FIG. 3. However, the method 700 can be used with any other suitable system.

Method 700 is performed on the laptop computing device 200 that includes multiple displays. For example, a primary display positioned on the first surface of the election device. A touch surface display is positioned on a second portion of a second surface of the electronic device. A touch bar display is positioned on a third surface of the electronic device. An input that is received with respect to one or more of the different displays can cause the electronic device to perform different function.

In block 710, the laptop computing device 200 displays first set of content on the touch surface display. The touch surface display is positioned on a second portion of a second surface of the electronic device.

In block 720, the laptop computing device 200 receives a first touch input on the touch surface display. The first touch input is associated with a portion of the displayed first set of content.

In block 730, in response to receiving the first touch input on the touch surface display, the laptop computing device 200 performing a first function. In certain embodiments, the first function activates a mode. The mode is associated with the touch surface display. The mode can be one of a writing mode, a drawing mode, a numeric mode, contextual information mode and a tool selection palette mode, and the like.

In certain embodiments, the touch surface display can include a touch pad. The first function, when performed can adjust the location, size, and shape of the touch pad that is displayed on the touch surface display.

In certain embodiments, the laptop computing device 200 displays a second set of content on the touch bar display. The laptop computing device 200 can receive a second touch input on the touch surface display. The second touch input is associated with a portion of the displayed second set of content. In response to receiving the second touch input, performing a second function. If the second touch input is received within a time threshold of the received first touch input another function is performed.

In certain embodiments, the laptop computing device 200 can detect when peripheral component is operably connected to the laptop computing device 200. Thereafter, the laptop computing device 200 can identify information associated with the peripheral component, and then display, on the touch surface display, the identified set of information associated with the peripheral component. The laptop computing device 200 can also cause a visual likeness of the peripheral component, to be displayed on the touch surface while the peripheral component is operably connected to the laptop computing device 200. The laptop computing device 200 can also display on the touch surface display, one or more operations associated with the peripheral component, while the peripheral component is operably connected to the laptop computing device 200.

Figure 8:
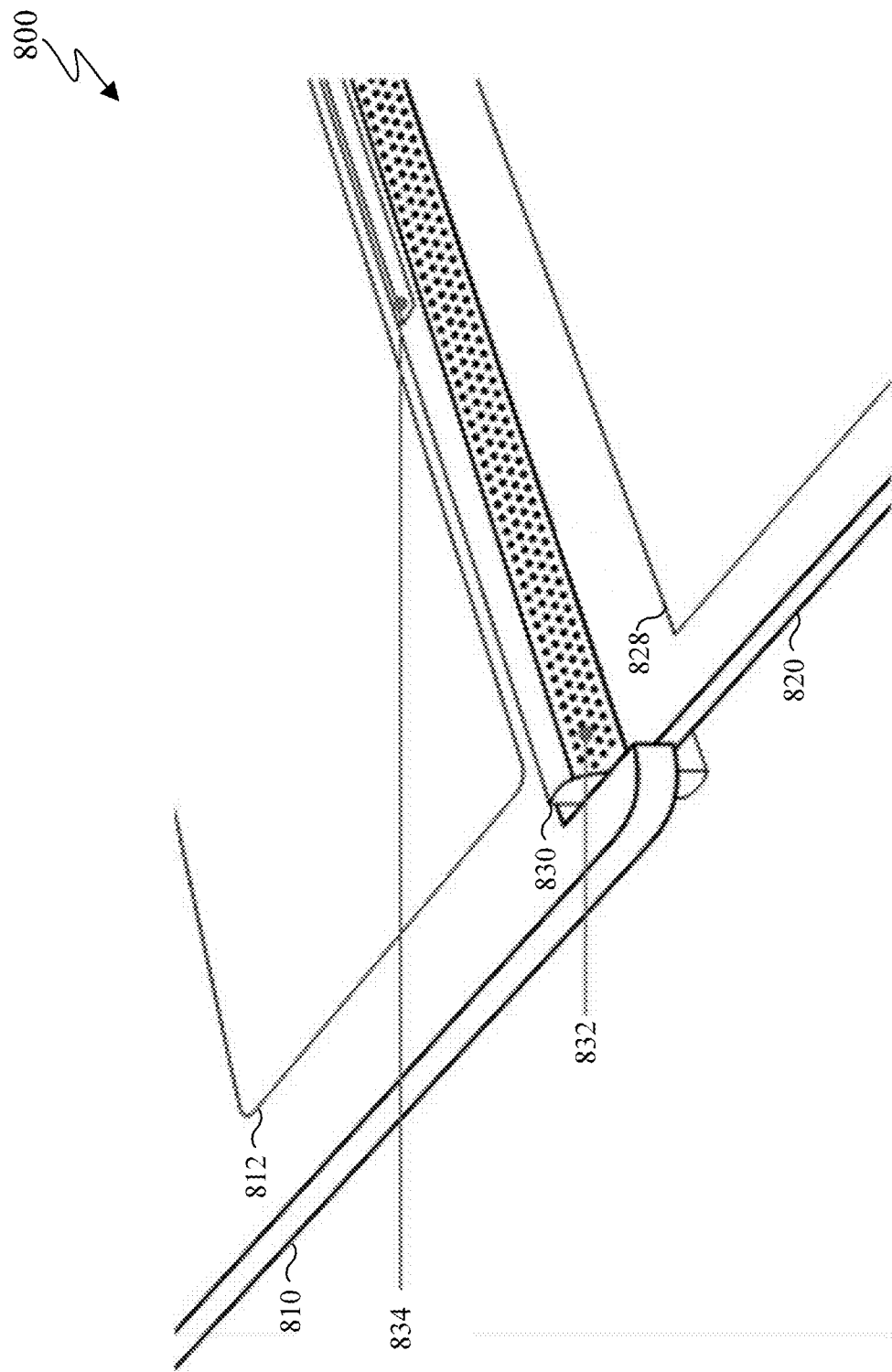
FIG. 8 illustrates a laptop with a rotating hinge mechanism in accordance with an embodiment of this disclosure.

FIG. 8 illustrates a laptop computing device 800 with a rotating hinge mechanism 830 in accordance with an embodiment of this disclosure. The laptop computing device 800 is similar to the laptop computing device 600 of FIG. 6, the laptop computing device 500 of FIGS. 5A-5C, the laptop computing device 400 of FIGS. 4A-4D, the electronic device 300 of FIG. 3, the laptop computing device 200 of FIG. 2 and can include internal components similar to the electronic device 100 of FIG. 1. The embodiment of the laptop computing device 800 shown in FIG. 8 is for illustration only. Other embodiments can be used without departing from the scope of the present disclosure.

The laptop computing device 800 includes a display member 810, a base member 820, and a two-step 360° rotating hinge mechanism 830. The display member 810 is similar to the display member 210 of FIG. 2, display member 410 of FIG. 4A, and the display member 610 of FIGS. 6A, 6B, and 6C. The display member 810 includes a display 812. The display 812 is similar to the display 612 of FIGS. 6A, 6B, and 6C, the primary display 412 of FIG. 4A, the primary display 312 of FIG. 3, and the primary display 212 of FIG. 2. The laptop computing device 600 includes a base member 620.

The base member 820 is similar to the base member 620 of FIGS. 6A, 6B, and 6C, the base member 420a and the base member 220 of FIG. 2. In certain embodiments, the base member 820 includes various I/O IF 828. The I/O IF 828 can include a touch surface display, a touch bar display, and a keyboard. The a touch surface display can be similar to the touch surface display 624 of FIGS. 6A, 6B, and 6C, the touch surface display 524 of FIGS. 5A-5C, the touch surface display 424 of FIG. 4A-4D, the touch surface display 314 of FIG. 3 and the touch surface display 224 of FIG. 2. The touch bar display can be similar to the touch bar display 630 of FIGS. 6A, 6B, and 6C, the touch bar display 316 of FIG. 3 and the touch bar display 226 of FIG. 2. FIG. 6C also includes keyboard 628. The keyboard can be similar to the keyboard 628 of FIGS. 6A, 6B, and 6C, the keyboard 528 of FIGS. 5A-5C, the keyboard 428 of FIGS. 4A-4D, and the keyboard 228 of FIG. 2.

The rotating hinge mechanism 830 is a two-step hinge that provides for the display member 810 and the base member 820 to rotate in 360°. The rotating hinge mechanism 830 allows the display member 810 to be smaller than the base member 820. The display member 810 sits on the base member 820 as a slab. The display member 810 can rotate a full 360°, converting the laptop computing device 800 into tablet type device.

In certain embodiments, the rotating hinge mechanism 830 can include a speaker 832 and a stylus 834. The speaker can be similar to the speaker 130 of FIG. 1. The speaker 832 can project audio that is heard by a user. The stylus 834 can be stored in the rotating hinge mechanism 830. The stylus 834 can be a small pen shaped instrument that is used to input commands on a touch surface such as the display 812 (if the display 812 is a touch screen), the touch display surface, the touch bar display, or a combination thereof. A stylus is often used instead of a keyboard or a mouse as pointing device. The stylus 834 can be accessible when the rotating hinge mechanism 830 rotates and converts the laptop computing device 800 to a tablet. In certain embodiments, the compartment that stores the stylus 834 can be used to store other items, e.g., wireless earbuds, and the like.

FIGS. 9A through 9K, discussed below illustrate the rotation of the laptop computing device 800 with a rotating hinge mechanism 830.

The rotating hinge mechanism 830 is a two-step hinge mechanism. The rotating hinge mechanism 830 is partially rotated for each step. A partial rotation of the rotating hinge mechanism 830 is depicted in FIG. 8. The partial rotation of the rotating hinge mechanism 830 depicts a location of the stylus 834. The location of the speaker corresponds to the position of the display member 810. For example, the speakers 832 can be positioned as to face a similar direction to that of the display member 810.

FIGS. 9A, 9B, 9C, 9D, 9E, 9F, 9G, 9H, 9I, 9J, and 9K illustrate an example laptop computing device 900 transitioning from a closed position to a fully open position in accordance with an embodiment of this disclosure. The laptop computing device 900 is similar to the laptop computing device 800 of FIG. 8, the laptop computing device 600 of FIG. 6, the laptop computing device 500 of FIGS. 5A-5C, the laptop computing device 400 of FIGS. 4A-4D, the electronic device 300 of FIG. 3, the laptop computing device 200 of FIG. 2 and can include internal components similar to the electronic device 100 of FIG. 1. The embodiment of the laptop computing device 900 shown in FIGS. 9A, 9B, 9C, 9D, 9E, 9F, 9G, 9H, 9I, 9J, and 9K are for illustration only. Other embodiments can be used without departing from the scope of the present disclosure.

FIGS. 9A, 9B, 9C, 9D, 9E, 9F, 9G, 9H, 9I, 9J, and 9K illustrate the laptop computing device 900 at various rotational positions along a rotational axis, such as the rotational axis 230 of FIG. 2. FIGS. 9A, 9B, 9C, 9D, 9E, 9F, 9G, 9H, 9I, 9J, and 9K include a display member 910, a base member 920, and a two-step hinge that includes a first hinge 930 and a second hinge 935. The display member 910 is similar to the display member 810 of FIG. 8, the display member 210 of FIG. 2, display member 410 of FIG. 4A, and the display member 610 of FIGS. 6A, 6B, and 6C. The display member can include a lid on one side and a display, such as the display 812 of FIG. 8, the display 612 of FIGS. 6A, 6B, and 6C, the primary display 412 of FIG. 4A, the primary display 312 of FIG. 3, and the primary display 212 of FIG. 2. The base member 920 is similar to the base member 820 of FIG. 8, the base member 620 of FIGS. 6A, 6B, and 6C, the base member 420a and the base member 220 of FIG. 2. The base member 920 can include an I/O IF on one or more sides and a bottom. The I/O IF is not positioned on the bottom side. The I/O IF can include a keyboard, a touch surface display, a touch bar display, or a combination thereof.

The two-step hinge that includes the first hinge 930 and the second hinge 935. The first hinge 930 is rotationally affixed to the base member 920. The first hinge 930 can include a speaker 932, such as the speaker 832 of FIG. 8. The first hinge 930 can also include a stylus 934 such as the stylus 834 of FIG. 8. The first hinge 930 rotates along axis 940. For example, the first hinge rotates along axis 940 when the display member 910 reaches threshold position with respect to the second hinge 935. The second hinge 935 is rotationally affixed to the first hinge 930 and the display member 910. The first hinge rotates along axis 945.

Figure 9A:
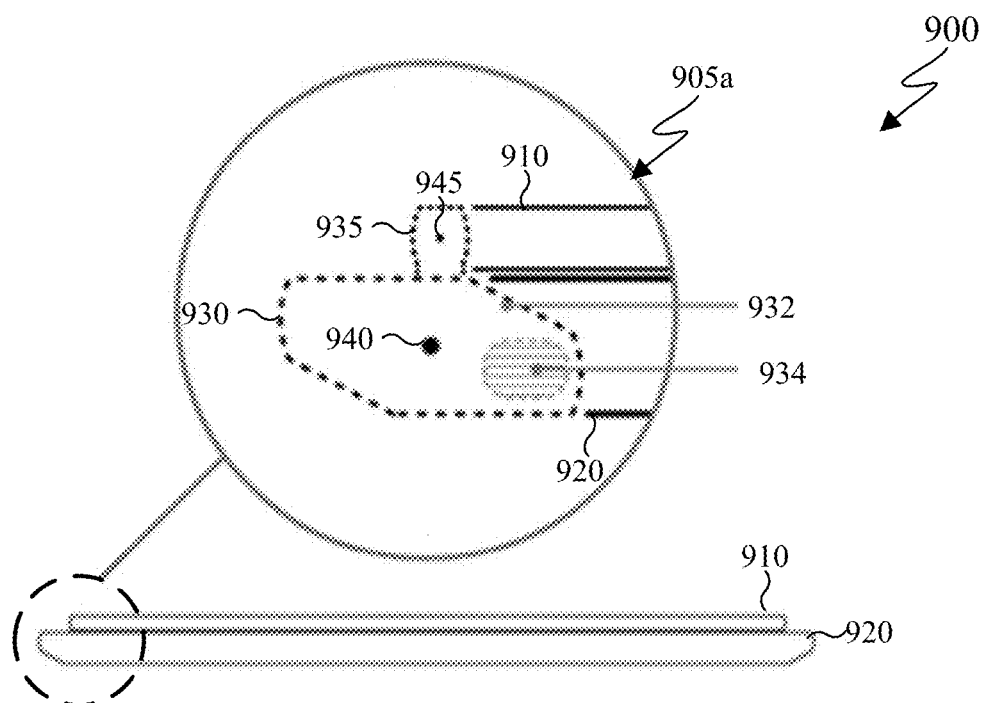
Figure 9B:
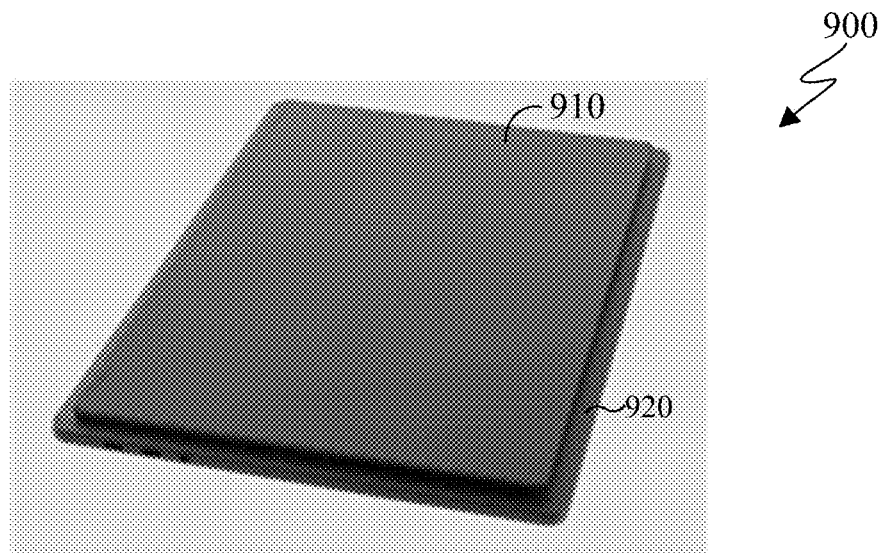

When the laptop computing device 900 is in a closed position, the display of the display member 910 and the keyboard of the base member 920 are in contact while the lid of the display member 910 and the bottom of the base member 920 are exposed. FIGS. 9A and 9B illustrate the laptop computing device 900 in the closed position. When the laptop computing device 900 is in a tablet position, the display of the display member 910, the lid of the display member 910 and the bottom of the base member 920 are in contact while display of the display member 910 and the keyboard of the base member 920 are exposed. FIGS. 9J and 9K illustrate the laptop computing device 900 in the tablet position. The FIGS. 9C, 9D, 9E, 9F, 9G, 9H, and 9I illustrate the laptop computing device 900 rotating and transitioning from the fully closed position (of FIGS. 9A and 9B) to the table position (of FIGS. 9J and 9K).

FIG. 9A depicts a cut-away side profile view of the laptop computing device 900 in the fully closed position. FIG. 9B illustrates a perspective view of the laptop computing device 900 in the fully closed position. The display of the display member 910 is in contact with the I/O IF of the base member 920. The hinge view 905a illustrates an enlarged view of the two-step hinge that includes the first hinge 930 and the second hinge 935. The stylus 934 is not accessible to the user, nor is the display of the display member 910 or the I/O IF of the base member 920 accessible to the user.

Figure 9C:
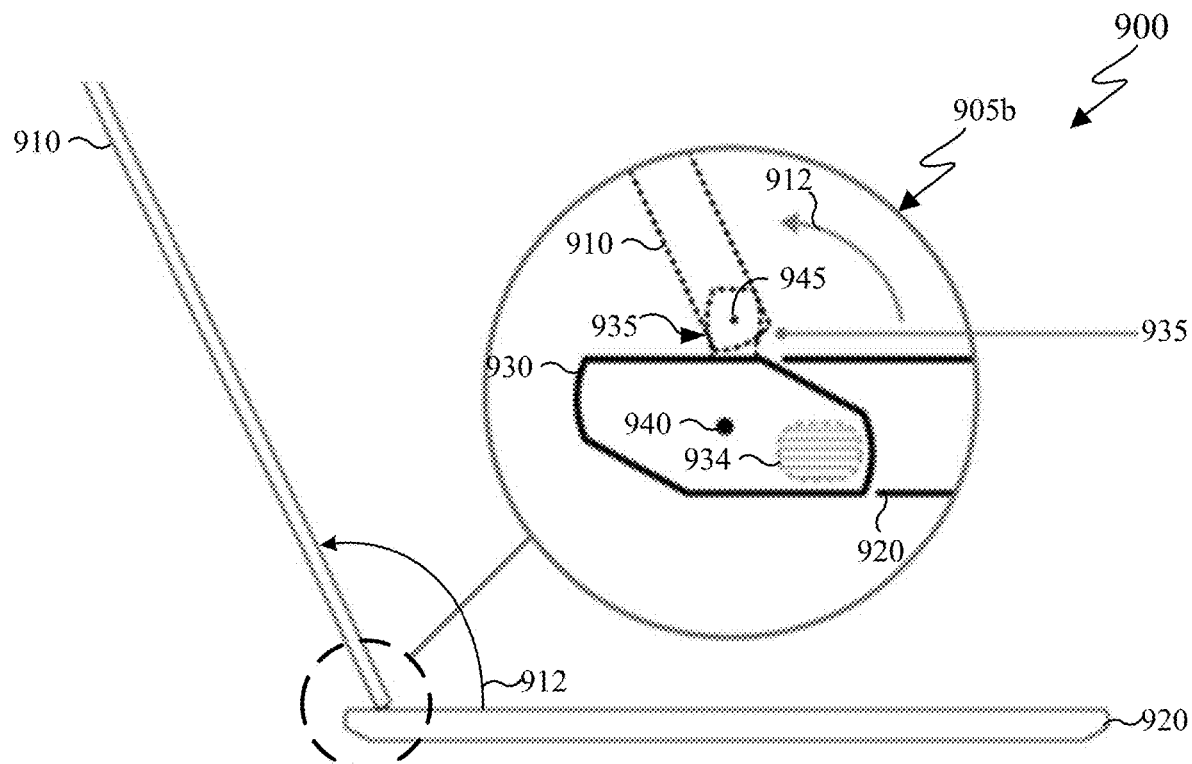
Figure 9D:

FIG. 9C depicts a cut-away side profile view of the laptop computing device 900 in a partially open position. FIG. 9D illustrates a perspective view of the laptop computing device 900 in a partially open position. The partially open position can be referred to as a working position, since a user can access the I/O IF of the base member 920 and view the display of the display member 910. The laptop computing device 900 is opened as indicated by rotation 912. The hinge view 905b illustrates an enlarged view of the two-step hinge that includes the first hinge 930 and the second hinge 935 as the display member rotated approximately 100° from the closed position of FIGS. 9A and 9B. When the laptop computing device 900 in the partially open position the stylus 934 is not accessible to the user. The display member 910 rotates along axis 945 of the second hinge 935 while the first hinge 930 remains in its initial position.

Figure 9E:
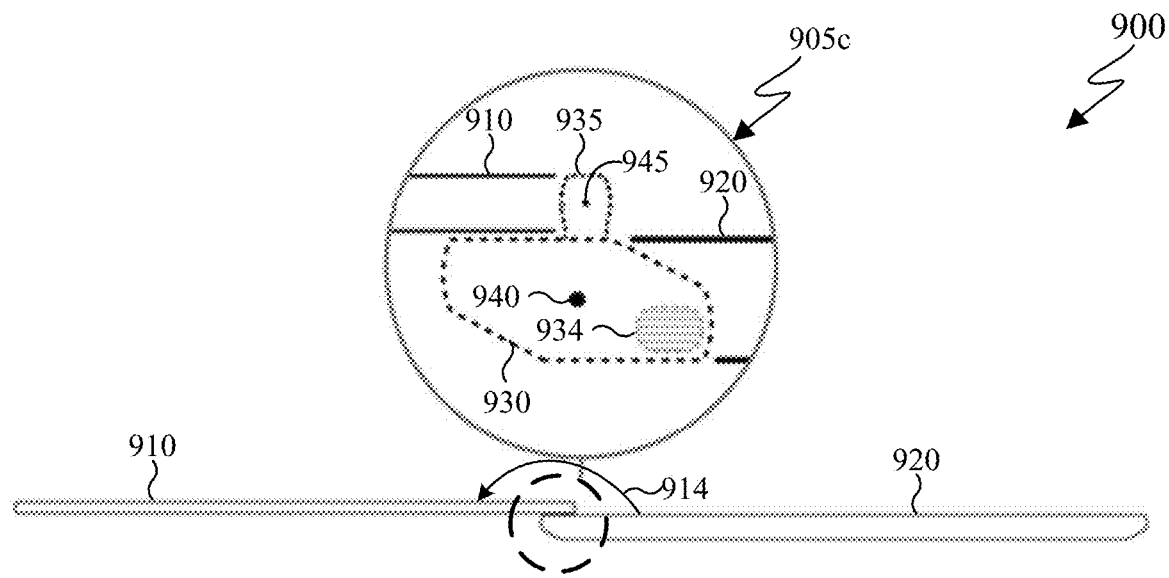
Figure 9F:
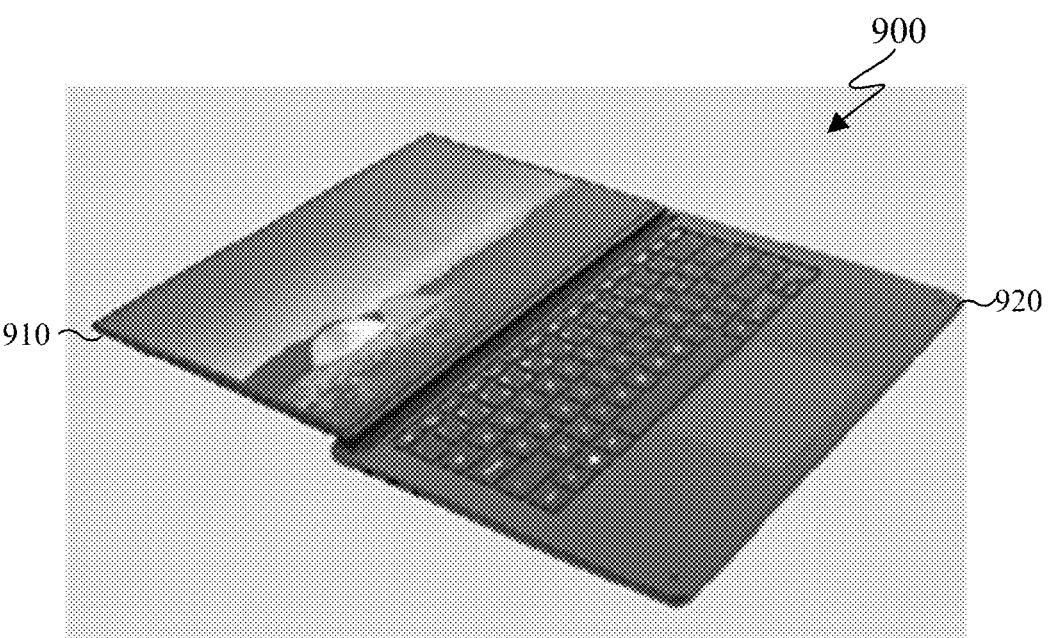
Figure 9J:
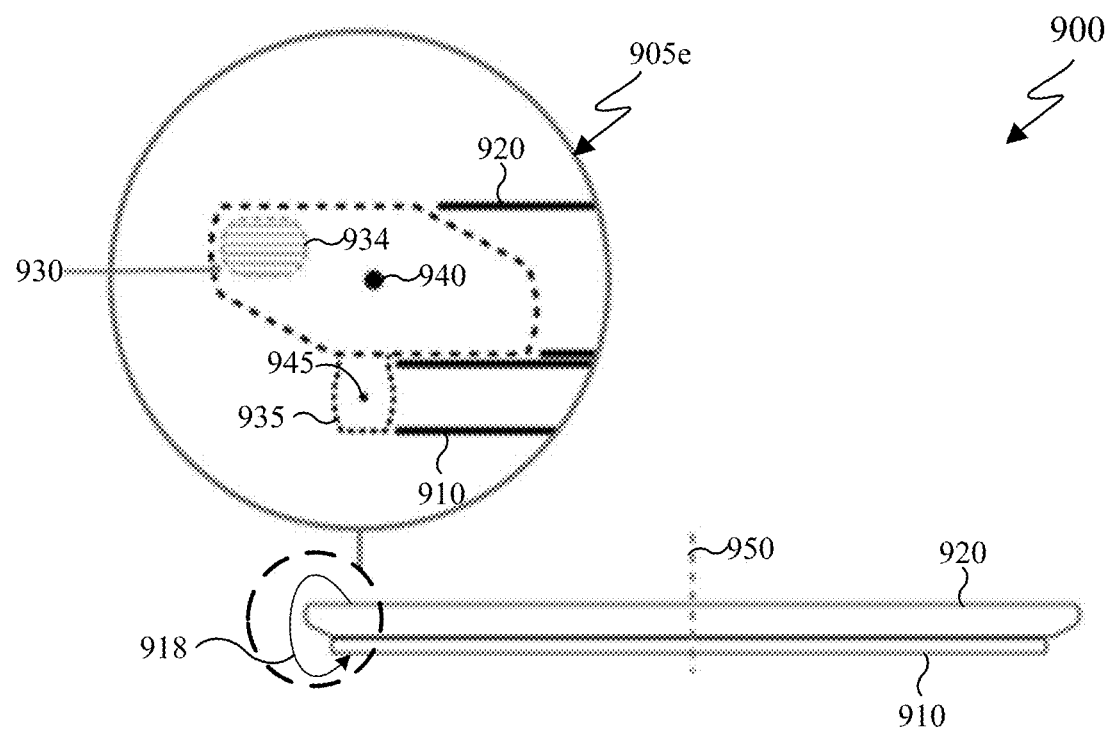
Figure 9K:
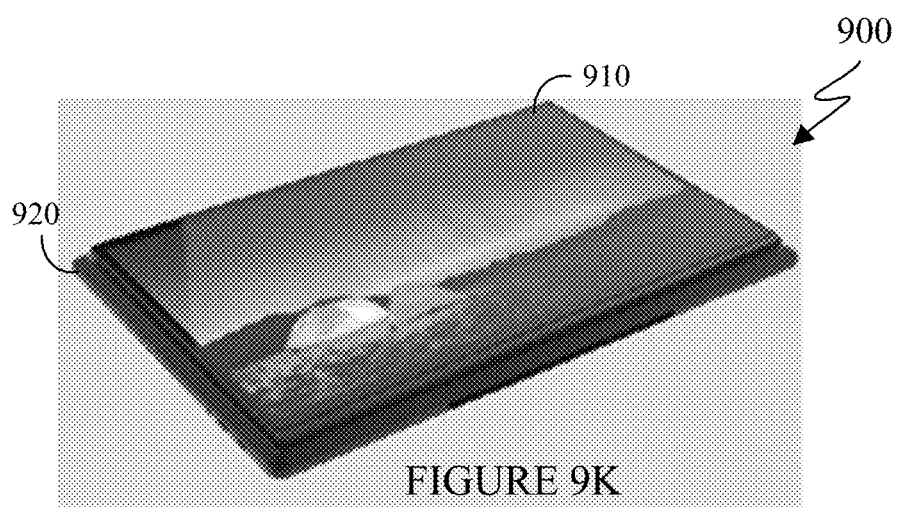

FIG. 9E depicts a cut-away side profile view of the laptop computing device 900 in an open position. FIG. 9F illustrates a perspective view of the laptop computing device 900 in an open position. The laptop computing device 900 is opened as indicated by rotation 914. The hinge view 905c illustrates an enlarged view of the two-step hinge that includes the first hinge 930 and the second hinge 935 as the display member rotated approximately 180° from the closed position of FIGS. 9A and 9B. The open position is the furthest the display member 910 can rotate along the axis 945 of the second hinge 935 without rotating the first hinge 930 along the axis 940. For example, the display member 910 rests along the top of the first hinge 930. When the display member is moved further, such as in FIG. 9G, the first hinge 930 is activated and rotates at the same rate as the display member 910.

FIG. 9G depicts a cut-away side profile view of the laptop computing device 900 in another open position. FIGS. 9H and 9I illustrate a perspective view of the laptop computing device 900 in other open positions. The laptop computing device 900 is opened as indicated by rotation 916. The hinge view 905d illustrates an enlarged view of the two-step hinge that includes the first hinge 930 and the second hinge 935 as the display member rotated approximately 270° from the closed position of FIGS. 9A and 9B. The open position, as illustrated in FIG. 9G, depicts the movement of the first hinge 930 as the display member 910 is pressed against the first hinge 930 and causes the first hinge to rotate along with the display member 910. The first hinge rotates along axis 940. As the first hinge 930 rotates, the stylus 934 is moved above the width of the base member 920. As the stylus 934 is moved above the width of the base member 920, the stylus becomes accessible to the user. For example, the laptop computing device 900 is in the tablet position, as illustrated in FIGS. 9J and 9K, the stylus becomes available due to the positioning of the first hinge 930.

FIG. 9J a cut-away side profile view of the laptop computing device 900 in the tablet position. FIG. 9K illustrates a perspective view of the laptop computing device 900 in the tablet position. The hinge view 905d illustrates an enlarged view of the two-step hinge that includes the first hinge 930 and the second hinge 935 as the display member rotated 360° from the closed position of FIGS. 9A and 9B. Due to the final position of the first hinge 930, the stylus 934 is accessible to the user as the stylus 934 is positioned at the top of the first hinge 930, and at approximately the same elevation as the display of the display member 910. It is noted that the laptop computing device 900 maintains a horizontal symmetry 950.

The rotation of the laptop computing device 900 from the closed position of FIGS. 9A and 9B to the tablet position of FIGS. 9J and 9K can be reversed. For example, the laptop computing device 900 can be rotated from the tablet position of FIGS. 9J and 9K to the closed position of FIGS. 9A and 9B and any other position there between. The illustrated positions of FIGS. 9C through 9I can be moved through in a single motion, such that the laptop computing device 900 does not remain in a single position for a period of time longer than a threshold.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a housing including a first surface, a second surface, and a third surface, wherein:
the third surface maintains a fixed angle with respect to the second surface and an angle between the second surface and the first surface varies,
when the housing is in an open position, the first surface, the second surface, and the third surface are exposed, and
when the housing is in a closed position, the third surface is exposed and the first surface faces the second surface and are concealed;

a keyboard positioned on a first portion of the second surface;
a primary display positioned on the first surface;
a touch surface display positioned on a second portion of the second surface;
a touch bar display positioned on the third surface; and
a processor positioned within the housing and operably connected to the keyboard, the primary display, the touch surface display, and the touch bar display, wherein the processor is configured to:
  display a first set of content on the touch surface display and a second set of content on the touch bar display;
  receive a first touch input on the touch surface display, the first touch input is associated with a portion of the displayed first set of content; and
  in response to receiving the first touch input on the touch surface display, perform a first function.

2. The electronic device of claim 1, further comprising a hinge, wherein the hinge configured to:
  couple the first surface to the second surface; and
  rotate at least one of the first surface and the second surface between a first position and a second position, wherein the keyboard is adjacent to the touch surface display on the second surface.

3. The electronic device of claim 1, wherein the processor is further configured to:
  receive a second touch input on the touch bar display, the second touch input is associated with a portion of the displayed second set of content; and
  in response to receiving the second touch input, perform a second function.

4. The electronic device of claim 1, wherein the processor is further configured to:
  receive a second touch input on the touch bar display, the second touch input is associated with a portion of the displayed second set of content; and
  in response to receiving the first touch input within a time threshold of receiving the second touch input, perform a second function.

5. The electronic device of claim 1, wherein the processor is further configured to:
  detect a peripheral component operably connected to the electronic device;
  identify a set of information associated with the peripheral component; and
  display, on the touch surface display, the identified set of information associated with the peripheral component.

6. The electronic device of claim 1, wherein the processor is further configured to:
  detect a peripheral component operably connected to the electronic device;
  display, on the touch surface display, a visual likeness of the peripheral component, while the peripheral component is operably connected to the electronic device; and
  display, on the touch surface display, one or more operations associated with the peripheral component, while the peripheral component is operably connected to the electronic device.

7. The electronic device of claim 1, wherein:
  the first function activates a mode, associated with the touch surface display; and
  the processor is further configured to identify the mode as one of a writing mode, a drawing mode, a numeric mode, contextual information mode and a tool selection palette mode.

8. The electronic device of claim 1, wherein the touch surface display includes an adjustable trackpad, and
  wherein the processor is further configured to modify at least one of a size of the adjustable trackpad, a shape of the adjustable trackpad, and a location of the adjustable trackpad on the touch surface display.

9. The electronic device of claim 1, wherein the primary display is a touch display screen.

10. A method for operating an electronic device including a primary display, a touch surface display and a touch bar display, the method comprising:
  displaying a first set of content on the touch surface display and a second set of content on the touch bar display;
  receiving a first touch input on the touch surface display, the first touch input is associated with a portion of the displayed first set of content; and
  in response to receiving the first touch input on the touch surface display, performing a first function,
  wherein the primary display positioned on a first surface of the election device, the touch surface display is positioned on a second portion of a second surface of the electronic device, and the touch bar display is positioned on a third surface of the electronic device,
  wherein the third surface maintains a fixed angle with respect to the second surface, and an angle between the second surface and the first surface varies, and
  wherein when the electronic device is in an open position, the first surface, the second surface, and the third surface are exposed and when the electronic device is in a closed position, the third surface is exposed and the first surface faces the second surface and are concealed.

11. The method of claim 10, further comprising:
  receiving a second touch input on the touch bar display, the second touch input is associated with a portion of the displayed second set of content; and
  in response to receiving the second touch input, performing a second function.

12. The method of claim 10, further comprising:
  receiving a second touch input on the touch bar display, the second touch input is associated with a portion of the displayed second set of content; and
  in response to receiving the first touch input within a time threshold of receiving the second touch input, perform a second function.

13. The method of claim 10, further comprising:
  detecting a peripheral component operably connected to the electronic device;
  identifying a set of information associated with the peripheral component; and
  displaying, on the touch surface display, the identified set of information associated with the peripheral component.

14. The method of claim 10, further comprising:
  detecting a peripheral component operably connected to the electronic device;
  displaying, on the touch surface display, a visual likeness of the peripheral component, while the peripheral component is operably connected to the electronic device; and
  displaying, on the touch surface display, one or more operations associated with the peripheral component, while the peripheral component is operably connected to the electronic device.

15. The method of claim 10, wherein:
  the first function activates a mode, associated with the touch surface display; and the method further comprises identifying the mode as one of a writing mode, a drawing mode, a numeric mode, contextual information mode and a tool selection palette mode.

16. The method of claim 10, wherein:

the touch surface display includes an adjustable trackpad, and the method further comprises modifying at least one of a size of the adjustable trackpad, a shape of the adjustable trackpad, and a location of the adjustable trackpad on the touch surface display.

17. A laptop computing device, comprising:

a first housing including a primary display and back surface, the primary display is opposite the back surface;

a second housing including a first input surface, a second input surface, and a bottom surface, wherein the first input surface is opposite the back surface and the second input surface maintains a fixed angle with respect to the first input surface and the bottom surface;

a hinge mechanism including a first hinge and a second hinge, the first hinge is coupled to the first housing, the second hinge is coupled to the second housing, and the first hinge is coupled to the second hinge;

a processor configured to display a first set of content on the first input surface and a second set of content on the second input surface; and wherein the hinge mechanism is configured to rotate the first housing with respect to the second housing from a first position through an intermediate position to a second position, wherein:

in the first position the primary display and the first input surface are in contact and concealed while the second input surface is exposed, in the second position the back surface and the bottom surface are in contact and concealed while the primary display and the second input surface are exposed, and in the intermediate position the primary display, the first input surface, and the second input surface are exposed.

18. The laptop computing device of claim 17, wherein:

the first hinge is configured to rotate the first housing around a first rotating axis; and the second hinge is configured to rotate the first hinge and the first housing around a second rotating axis.

19. The laptop computing device of claim 17, further comprising a stylus positioned within the second hinge, wherein the stylus is removable when the hinge mechanism is in the second position.

20. The laptop computing device of claim 17, further comprising one or more speakers positioned on a portion of the second hinge.

* * * * *